United States Patent
Kuo

(10) Patent No.: US 11,675,287 B1
(45) Date of Patent: Jun. 13, 2023

(54) HIERARCHICAL LINEAR LED PRINTHEAD SYSTEM

(71) Applicant: Eastman Kodak Company, Rochester, NY (US)

(72) Inventor: Chung-Hui Kuo, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 17/740,409

(22) Filed: May 10, 2022

(51) Int. Cl.
    *G03G 15/043*     (2006.01)
    *G06K 15/02*     (2006.01)
    *G06K 15/14*     (2006.01)

(52) U.S. Cl.
    CPC .......... *G03G 15/043* (2013.01); *G06K 15/14* (2013.01); *G06K 15/1801* (2013.01)

(58) Field of Classification Search
None
See application file for complete search history.

(56) References Cited

U.S. PATENT DOCUMENTS

| | | |
|---|---|---|
| 7,079,281 B1 | 7/2006 | Ng et al. |
| 7,079,287 B1 | 7/2006 | Ng et al. |
| 7,830,569 B2 | 11/2010 | Tai et al. |
| 8,824,907 B2 | 9/2014 | Kuo et al. |
| 9,147,232 B1 | 9/2015 | Kuo et al. |
| 9,712,712 B1* | 7/2017 | Kuo .................... G03G 15/326 |
| 10,036,975 B1 | 7/2018 | Kuo et al. |
| 10,062,017 B2 | 8/2018 | Kuo et al. |
| 2011/0074861 A1* | 3/2011 | Saettel .................. B41J 2/2135 347/19 |

* cited by examiner

*Primary Examiner* — Lennin R Rodriguezgonzalez
(74) *Attorney, Agent, or Firm* — David A. Novais

(57) ABSTRACT

A hierarchical printhead system supports multiple print modes. A first print mode uses a first subset of light sources having a first spacing. A second print mode uses a second subset of light sources having a second spacing which is less than the first spacing. Image data for lines of image data are sequentially loaded into the printhead, wherein if the specified print mode is the first print mode, image data for a first group of light sources corresponding to the first subset are loaded, and if the specified print mode is the second print mode, image data for the first group of light sources are first loaded, and then image data for a second group of light sources corresponding to the light sources in the second subset that are not in the first subset are loaded.

12 Claims, 21 Drawing Sheets

Copies: 1

Page Range:
- ● All
- ○ From [ ] To [ ]

Resolution:
- ○ 300 lines/inch
- ● 600 lines/inch
- ○ 1200 lines/inch

Print Speed:
- ○ 83 pages/minute
- ● 100 pages/minute
- ○ 120 pages/minute
- ○ 140 pages/minute
- ○ 166 pages/minute

FIG. 16

HIERARCHICAL LINEAR LED PRINTHEAD SYSTEM

CROSS-REFERENCE TO RELATED APPLICATIONS

Reference is made to commonly assigned, U.S. Patent Application Ser. No. 63/271,327, (now Ser. No. 17/965,006), entitled: "Reducing artifacts using alternating light source power levels," by C.-H. Kuo; and to commonly assigned, U.S. patent application Ser. No. 17/740,406, entitled: "Hierarchical linear led printhead design," by C.-H. Kuo each of which is incorporated herein by reference.

FIELD OF THE INVENTION

This invention pertains to the field of electrographic printing and more particularly to reducing artifacts in high-speed print modes.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multi-color print image on the receiver.

Typically, a linear printhead including an array of LED light sources is used to form the electrostatic latent image. The printhead generally has an 8-bit interface which enables 256 different exposure levels to be provided by each of the light sources. The exposure level provided by the light sources is typically controlled by adjusting a time that the light sources are activated, where each of the pixel code values is mapped to an exposure time that provides an aim exposure level.

It is sometimes desirable to provide high-speed print modes in an electrophotographic printer which may require compromising on the image quality. For example, it may be necessary to print with a reduced spatial resolution due to limitations on the image data loading time and the required pixel exposure time. For print modes that only utilize a fraction of the light sources, conventional printhead architectures still require that data be loaded into the printhead for all of the light sources due to the associated sequential pixel loading requirement. This places a limitation on the time required to load the image data, and therefore on the maximum printing speed. There remains a need for means for reducing the time needed to load image data into the printhead in high-speed print modes.

SUMMARY OF THE INVENTION

The present invention represents a hierarchical printhead system adapted to support multiple print modes in a digital printing system, including:

a printhead including an array of pixels, each pixel having an associated light source for exposing a photosensitive medium moving past the printhead at a defined velocity, the light sources being spaced apart by a light-source spacing in a cross-track direction, wherein the light sources are activated in response to a print line signal, an exposure level provided by each light source being controlled by a corresponding pixel code value;

wherein a first subset of the light sources is used in a first print mode, the first subset of light sources being a periodic pattern of light sources spaced apart by a predefined first spacing which is a first integer multiple of the light-source spacing; and wherein a second subset of the light sources is used in a second print mode, the second subset of light sources being a periodic pattern of light sources spaced apart by a predefined second spacing which is a second integer multiple of the light-source spacing, the second integer multiple being less than the first integer multiple, and wherein the second subset of light sources includes all of the light sources in the first subset of light sources;

a first printhead memory adapted to load image data into a first group of light sources, the first group of light sources corresponding to the first subset of light sources;

a second printhead memory adapted to load image data into a second group of light sources, the second group of light sources corresponding to the light sources in the second subset of light sources that are not in the first subset of light sources;

a switching unit adapted to receive lines of image data and direct the received image data into the appropriate printhead memories, each line of image data including a one-dimensional array of image pixels having pixel code values, wherein the lines of image data have been reordered in accordance with a specified print mode;

wherein if the specified print mode is the first print mode, the switching unit receives image data for the first group of light sources and directs the received image data for the first group of light sources into the first printhead memory; and wherein if the specified print mode is the second print mode, the switching unit first receives first image data for the first group of light sources and directs the received image data for the first group of light sources into the first printhead memory, and then receives image data for the second group of light sources and directs the received image data for the second group of light sources into the second printhead memory; and a data load trigger that causes the image data stored in the first and second printhead memories to be loaded into the corresponding pixels of the printhead for printing using the corresponding light sources.

This invention has the advantage that image data can be efficiently loaded into a printhead for low-resolution print modes which utilize a subset of the light sources, thereby reducing data load times.

It has the additional advantage that computational requirements for image processing operations such as halftoning can be minimized for low-resolution print modes. Furthermore, the image processing operations can be better optimized in the low-resolution print modes.

BRIEF DESCRIPTION OF THE DRAWINGS

FIG. 16 illustrates an exemplary user interface that enables a user to select options for specifying a print mode;

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
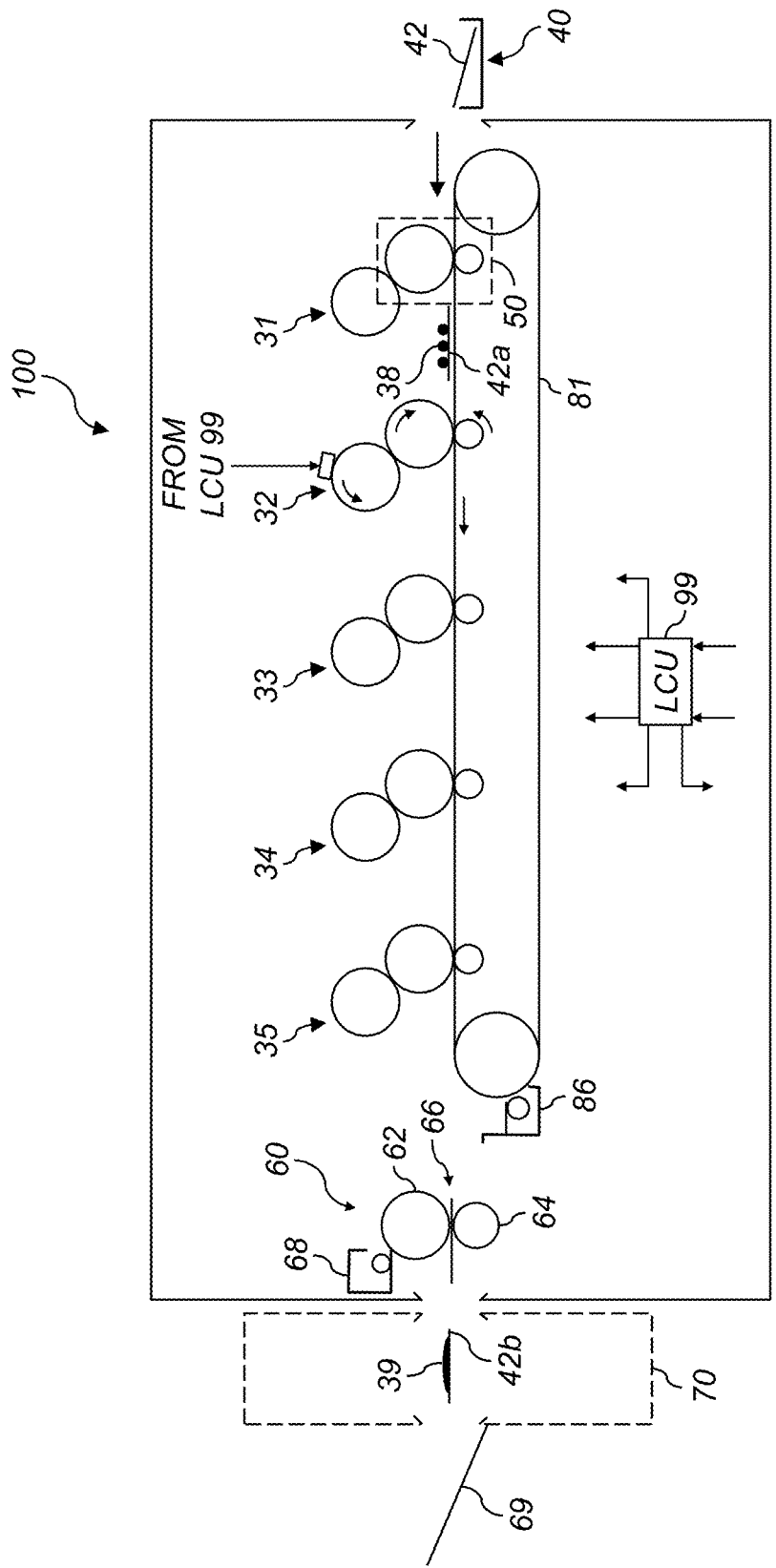
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, "sheet" is a discrete piece of media, such as receiver media for an electrophotographic printer (described below). Sheets have a length and a width. Sheets are folded along fold axes (e.g., positioned in the center of the sheet in the length dimension, and extending the full width of the sheet). The folded sheet contains two "leaves," each leaf being that portion of the sheet on one side of the fold axis. The two sides of each leaf are referred to as "pages." "Face" refers to one side of the sheet, whether before or after folding.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles typically have a range of diameters (e.g., less than 8 µm, on the order of 10-15 µm, up to approximately 30 µm, or larger), where "diameter" preferably refers to the volume-weighted median diameter, as determined by a device such as a Coulter Multisizer.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 μm or 20-300 μm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

In an embodiment of an electrophotographic modular printing machine useful with various embodiments (e.g., the NEXFINITY Digital Press manufactured by Eastman Kodak Company of Rochester, N.Y.) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
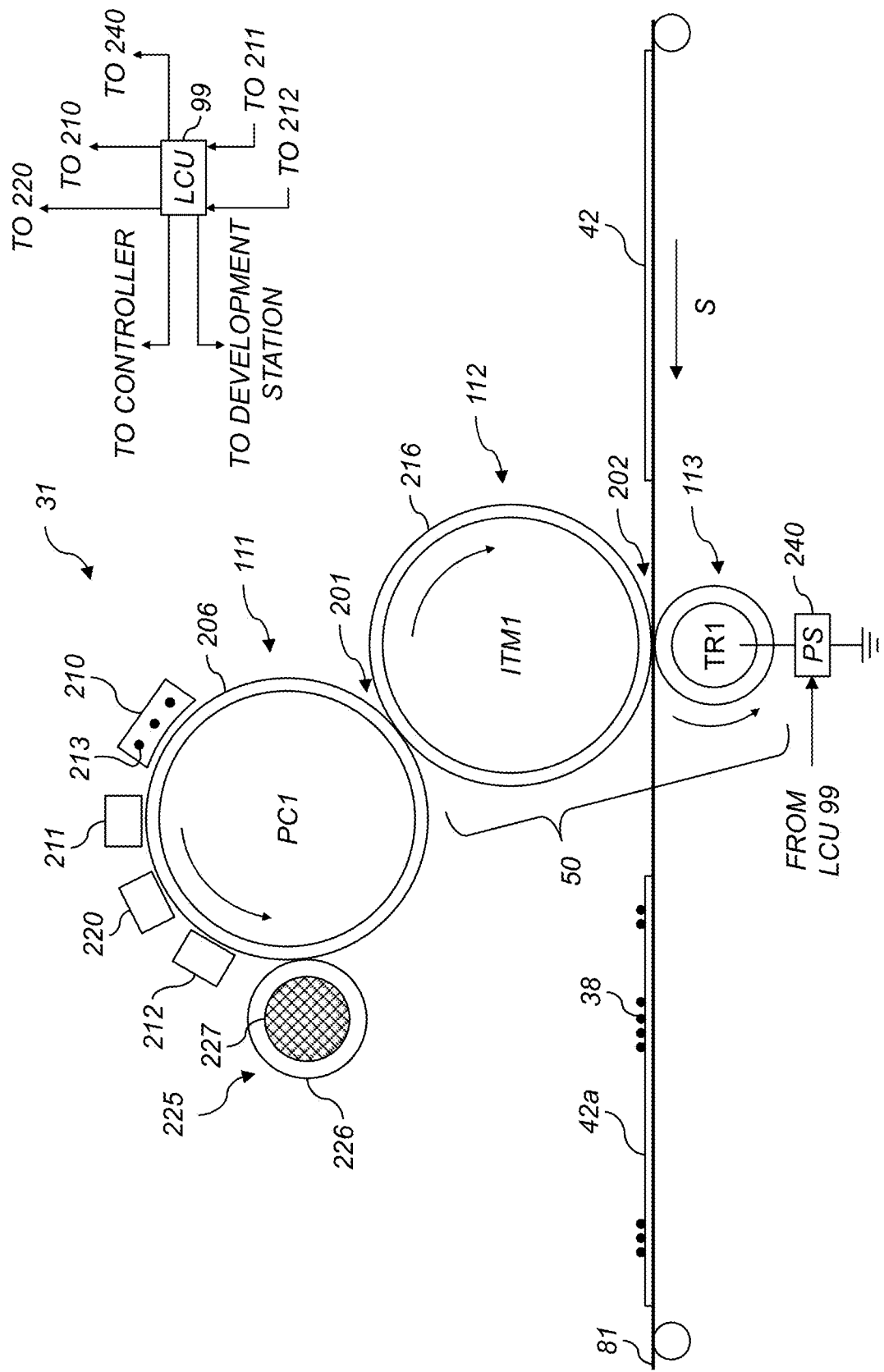
FIG. 2 is an elevational cross-section of one printing module of the electrophotographic printer of FIG. 1.

FIGS. 1 and 2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing subsystems 31, 32, 33, 34, 35, also known as electrophotographic imaging subsystems. Each printing subsystem 31, 32, 33, 34, 35 produces a single-color toner image for transfer using a respective transfer subsystem 50 (for clarity, only one is labeled) to a receiver 42 successively moved through the modules. In some embodiments one or more of the printing subsystem 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing subsystems 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing subsystem 31 forms black (K) print images, printing subsystem 32 forms yellow (Y) print images, printing subsystem 33 forms magenta (M) print images, and printing subsystem 34 forms cyan (C) print images.

Printing subsystem 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42*a* is shown after passing through printing subsystem 31. Print image 38 on receiver 42*a* includes unfused toner particles. Subsequent to transfer of the respective print images, overlaid in registration, one from each of the respective printing subsystems 31, 32, 33, 34, 35, receiver 42*a* is advanced to a fuser module 60 (i.e., a fusing or fixing assembly) to fuse the print image 38 to the receiver 42*a*. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42*b* carrying fused image 39) are transported in series from the fuser module 60 along a path either to an output tray 69, or back to printing subsystems 31, 32, 33, 34, 35 to form an image on the backside of the receiver (i.e., to form a duplex print). Receivers 42*b* can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42*b* passes through a finisher 70. Finisher 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

FIG. 2 shows additional details of printing subsystem 31, which is representative of printing subsystems 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing subsystems. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a linear array extending in a cross-track direction such that all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing subsystem 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and thence to a receiver 42 which receives respective toned print images 38 from each printing subsystem in superposition to form a composite image thereon. The print image 38 is, for example, a separation of one color, such as cyan. Receiver 42 is transported by transport web 81. Transfer to a receiver is effected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NexPress 2100. In some embodiments, a single transfer member is used to sequentially transfer toner images from each color channel to the receiver 42. In other embodiments, the separate toner images can be transferred in register directly from the photoreceptor 206 in the respective printing subsystem 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing subsystem 31, 32, 33, 34, 35 (FIG. 1), among other components. Each printing subsystem can also have its own respective controller (not shown) coupled to LCU 99.

Various finishing systems can be used to apply features such as protection, glossing, or binding to the printed images. The finishing systems can be implemented as integral components of the printer 100, or can include one or more separate machines through which the printed images are fed after they are printed.

Figure 3:
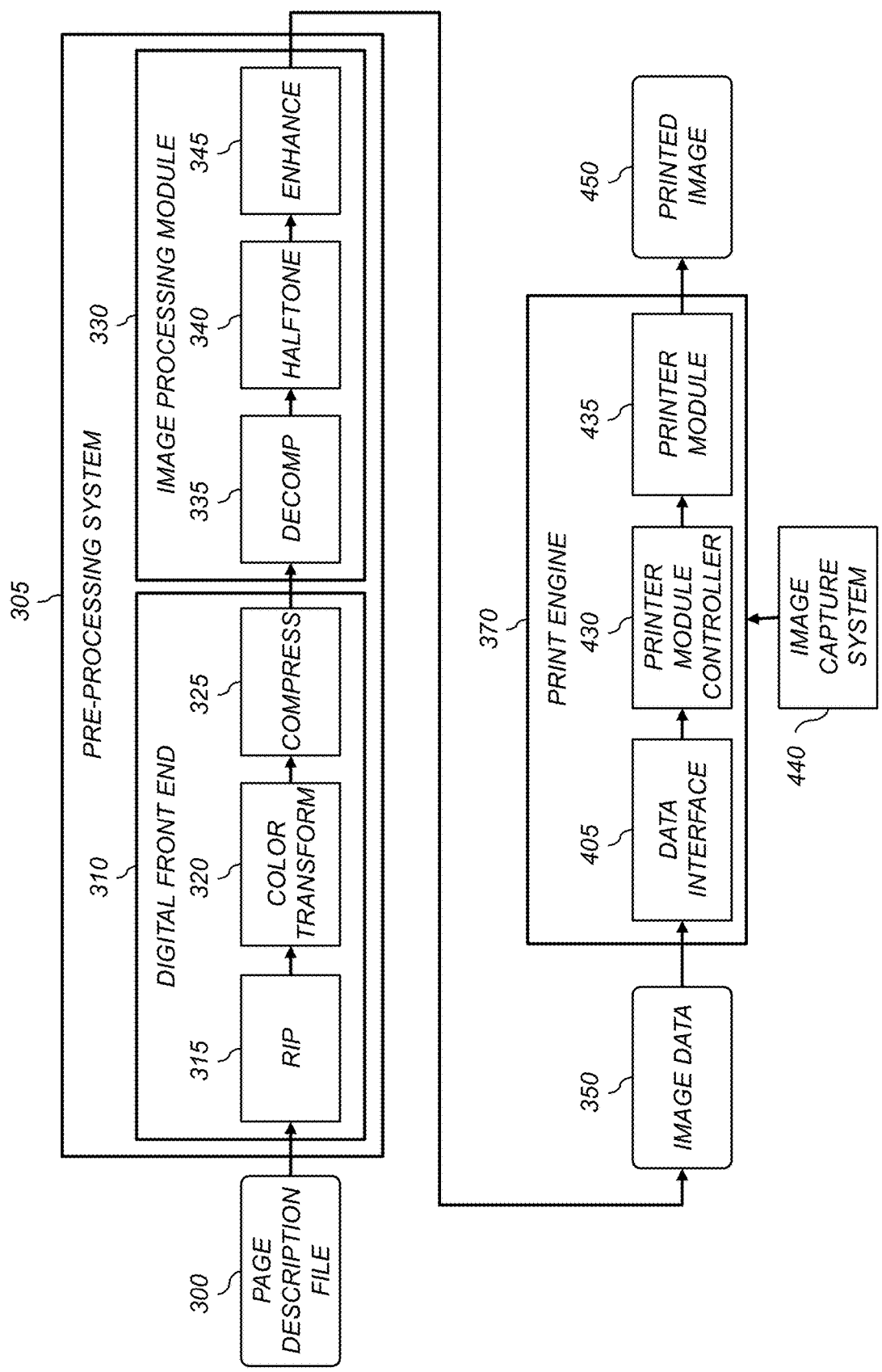
FIG. 3 shows a processing path for producing a printed image using a pre-processing system coupled to a print engine.

FIG. 3 shows a processing path that can be used to produce a printed image 450 with a print engine 370 in accordance with embodiments of the invention. A pre-processing system 305 is used to process a page description file 300 to provide image data 350 that is in a form that is ready to be printed by the print engine 370. In an exemplary configuration, the pre-processing system 305 includes a digital front end (DFE) 310 and an image processing module 330. The pre-processing system 305 can be a part of printer 100 (FIG. 1) or may be a separate system which is remote from the printer 100. The DFE 310 and the image processing module 330 can each include one or more suitably-programmed computer or logic devices adapted to perform operations appropriate to provide the image data 350.

The DFE 310 receives page description files 300 which define the pages that are to be printed. The page description files 300 can be in any appropriate format (e.g., the well-known Postscript command file format or the PDF file format) that specifies the content of a page in terms of text, graphics and image objects. The image objects are typically provided by input devices such as scanners, digital cameras or computer generated graphics systems. The page description file 300 can also specify invisible content such as specifications of texture, gloss or protective coating patterns.

The DFE 310 rasterizes the page description file 300 into image bitmaps for the print engine to print. The DFE 310 can include various processors, such as a raster image processor (RIP) 315, a color transform processor 320 and a compression processor 325. It can also include other processors not shown in FIG. 3, such as an image positioning processor or an image storage processor. In some embodiments, the DFE 310 enables a human operator to set up parameters such as layout, font, color, media type or post-finishing options.

The RIP 315 rasterizes the objects in the page description file 300 into an image bitmap including an array of image pixels at an image resolution that is appropriate for the print engine 370. For text or graphics objects the RIP 315 will create the image bitmap based on the object definitions. For image objects, the RIP 315 will resample the image data to the desired image resolution.

The color transform processor 320 will transform the image data to the color space required by the print engine 370, providing color separations for each of the color channels (e.g., CMYK). For cases where the print engine 370 includes one or more additional colors (e.g., red, blue, green, gray or clear), the color transform processor 320 will also provide color separations for each of the additional color channels. The objects defined in the page description file 300 can be in any appropriate input color space such as RGB, CIELAB, PCS LAB or CMYK. In some cases, different objects may be defined using different color spaces. The color transform processor 320 applies an appropriate color transform to convert the objects to the device-dependent color space of the print engine 370. Methods for creating such color transforms are well-known in the color management art, and any such method can be used in accordance with the present invention. Typically, the color transforms are defined using color management profiles that include multi-dimensional look-up tables. Input color profiles are used to define a relationship between the input color space and a profile connection space (PCS) defined for a color management system (e.g., the well-known ICC PCS associated with the ICC color management system). Output color profiles define a relationship between the PCS and the device-dependent output color space for the printer 100. The color transform processor 320 transforms the image data using the color management profiles. Typically, the output of the color transform processor 320 will be a set of color separations including an array of pixels for each of the color channels of the print engine 370 stored in memory buffers.

The processing applied in digital front end 310 can also include other operations not shown in FIG. 3. For example, in some configurations, the DFE 310 can apply a halo correction process described in commonly-assigned U.S. Pat. No. 9,147,232 to Kuo entitled "Reducing halo artifacts in electrophotographic printing systems," which is incorporated herein by reference.

The image data provided by the digital front end 310 is sent to the image processing module 330 for further processing. In order to reduce the time needed to transmit the image data, the compressor processor 325 is typically used to compress the image data using an appropriate compression algorithm. In some cases, different compression algorithms can be applied to different portions of the image data. For example, a lossy compression algorithm (e.g., the well-known JPEG algorithm) can be applied to portions of the image data including image objects, and a lossless compression algorithm can be applied to portions of the image data including binary text and graphics objects. The compressed image values are then transmitted over a data link to the image processing module 330, where they are decompressed using a decompression processor 335 which applies corresponding decompression algorithms to the compressed image data.

A halftone processor 340 is used to apply a halftoning process to the image data. The halftone processor 340 can apply any appropriate halftoning process known in the art. Within the context of the present disclosure, halftoning processes are applied to a continuous-tone image to provide an image having a halftone dot structure appropriate for printing using the printer module 435. The output of the halftoning can be a binary image or a multi-level image. In an exemplary configuration, the halftone processor 340 applies the halftoning process described in commonly assigned U.S. Pat. No. 7,830,569 to Tai et al., entitled "Multilevel halftone screen and sets thereof," which is incorporated herein by reference. For this halftoning process, a three-dimensional halftone screen is provided that includes a plurality of planes, each corresponding to one or more intensity levels of the input image data. Each plane defines a pattern of output exposure intensity values corresponding to the desired halftone pattern. The halftoned pixel values are multi-level values at the bit depth appropriate for the print engine 370.

An image enhancement processor 345 can apply a variety of image processing operations. For example, the image enhancement processor 345 can be used to apply various image enhancement operations. In some configurations, the image enhancement processor 345 can apply an algorithm that modifies the halftone process in edge regions of the image (see U.S. Pat. No. 7,079,281, entitled "Edge enhancement processor and method with adjustable threshold setting" and U.S. Pat. No. 7,079,287 entitled "Edge enhancement of gray level images," both to Ng et al., and both of which are incorporated herein by reference).

The pre-processing system 305 provides the image data 350 to the print engine 370, where it is printed to provide the printed image 450. The pre-processing system 305 can also provide various signals to the print engine 370 to control the timing at which the image data 350 is printed by the print engine 370. For example, the pre-processing system 305 can signal the print engine 370 to start printing when a sufficient number of lines of image data 350 have been processed and buffered to ensure that the pre-processing system 305 will be capable of keeping up with the rate at which the print engine 370 can print the image data 350.

A data interface 405 in the print engine 370 receives the data from the pre-processing system 305. The data interface 405 can use any type of communication protocol known in the art, such as standard Ethernet network connections. A printer module controller 430 controls a printer module 435 in accordance with the received image data 350. In an exemplary configuration, the printer module 435 can be the printer 100 of FIG. 1, which includes a plurality of individual electrophotographic printing subsystems 31, 32, 33, 34, 35 for each of the color channels. For example, the printer module controller 430 can provide appropriate control signals to activate light sources in the exposure subsystem 220 (FIG. 2) to expose the photoreceptor 206 with an exposure pattern. In some configurations, the printer module controller 430 can apply various image enhancement operations to the image data. For example, an algorithm can be applied to compensate for various sources of non-uniformity in the printer 100 (e.g., streaks formed in the charging subsystem 210, the exposure subsystem 220, the development station 225 or the fuser module 60). One such compensation algorithm is described in commonly-assigned U.S. Pat. No. 8,824,907 to Kuo et al., entitled "Electrophotographic printing with column-dependent tonescale adjustment," which is incorporated herein by reference.

In some cases, the printing system can also include an image capture system 440. The image capture system 440 can be used for purposes such as system calibration. The image capture system 440 can use any appropriate image capture technology such as a digital scanner system, or a digital camera system. The image capture system 440 can be integrated into the printing system, or can be a separate system which is in communication with the printing system.

In the configuration of FIG. 3, the pre-processing system 305 is tightly coupled to the print engine 370 in that it supplies image data 350 in a state which is matched to the printer resolution and the halftoning state required for the printer module 435. In other configurations, the print engine can be designed to be adaptive to the characteristics of different pre-processing systems 305 as is described in commonly-assigned, co-pending U.S. Pat. No. 10,062,017 to Kuo et al., entitled "Print engine with adaptive processing," which is incorporated herein by reference.

Figure 4:
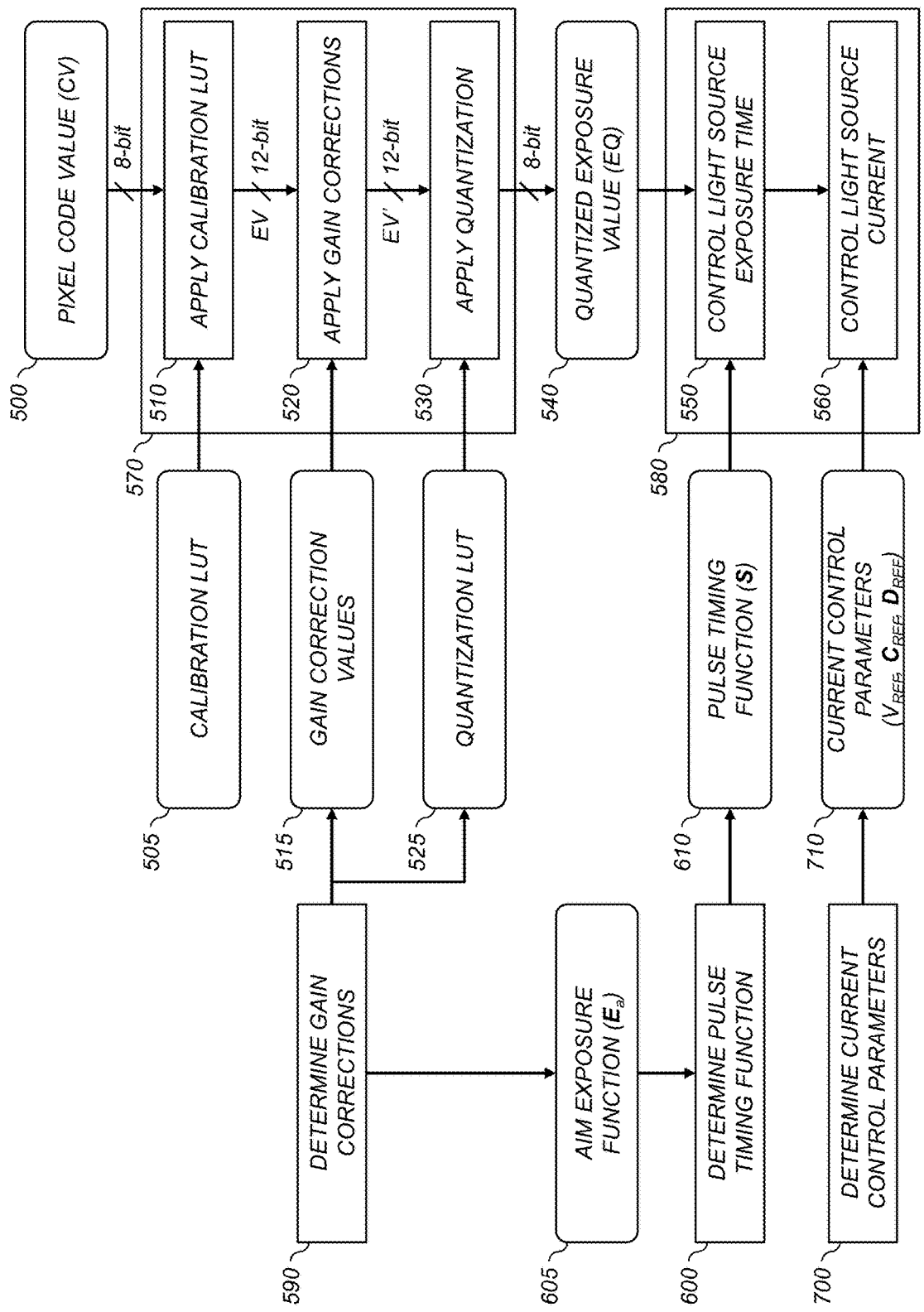
FIG. 4 is a flow chart showing processing operations that are used to apply various calibration and artifact correction processes in accordance with exemplary embodiments.

FIG. 4 shows a flow chart of processing operations that can be used to apply various calibration processes in accordance with exemplary embodiments. Some of the operations can be applied in data processing electronics 570 before passing the image data to the printer module 435 (e.g., in the printer module controller 430 (FIG. 3)), while other operations can be applied in printhead electronics 580 associated with the exposure subsystem 220 (FIG. 2) of the printer module 435.

The input to the flow chart is a pixel code value 500 for an image pixel in an array of image data to be printed by one of the electrophotographic printing subsystems 31, 32, 33, 34, 35 in the printer 100. In an exemplary embodiment, the pixel code value 500 can be a pixel of the image data 350 that is input to the print engine 370 (see FIG. 3). Typically, the pixel code value 500 will be an 8-bit number between 0-255.

An apply calibration LUT step 510 is used to apply a calibration look-up-table (LUT) 505 to the pixel code value 500. Typically, the output of the calibration LUT will be an exposure value EV which is linear with the exposure level to be provided by the printhead. In an exemplary arrangement, the exposure value EV is represented by a 12-bit integer in the range 0-4095. The exposure value EV corresponds to the exposure that should be provided to the photoreceptor 206 (FIG. 2) by the exposure subsystem 202 such that the printer 100 (FIG. 1) produces an aim density value appropriate for the pixel code value 500.

An apply gain corrections step 520 is used to apply gain correction values 515 on a pixel-by-pixel basis to compensate for various sources of non-uniformity in the printer 100 (e.g., streaks formed in the charging subsystem 210, the exposure subsystem 220, the development station 225 or the fuser module 60). In an exemplary embodiment, the apply gain corrections step 520 applies the compensation algorithm described in the aforementioned U.S. Pat. No. 8,824,907. This method involves determining two gain correction values 515 (i.e., G1 and G2) for each light source in the linear printhead. The output of the apply gain corrections step 520 is a modified exposure value EV'.

While the exposure value EV is a 12-bit number in an exemplary configuration, only 256 of the different code values will be used since the pixel code value 500 is an 8-bit number. The apply gain corrections step 520 will modify the exposure value EV for each light source in a different manner in accordance with the associated gain correction values 515. As a result, the modified exposure values EV' will generally utilize many more of the available 12-bit code values. The exact set of code values that are used will depend on the gain correction values 515 that are necessary to correct for the streak artifacts.

Figure 5:
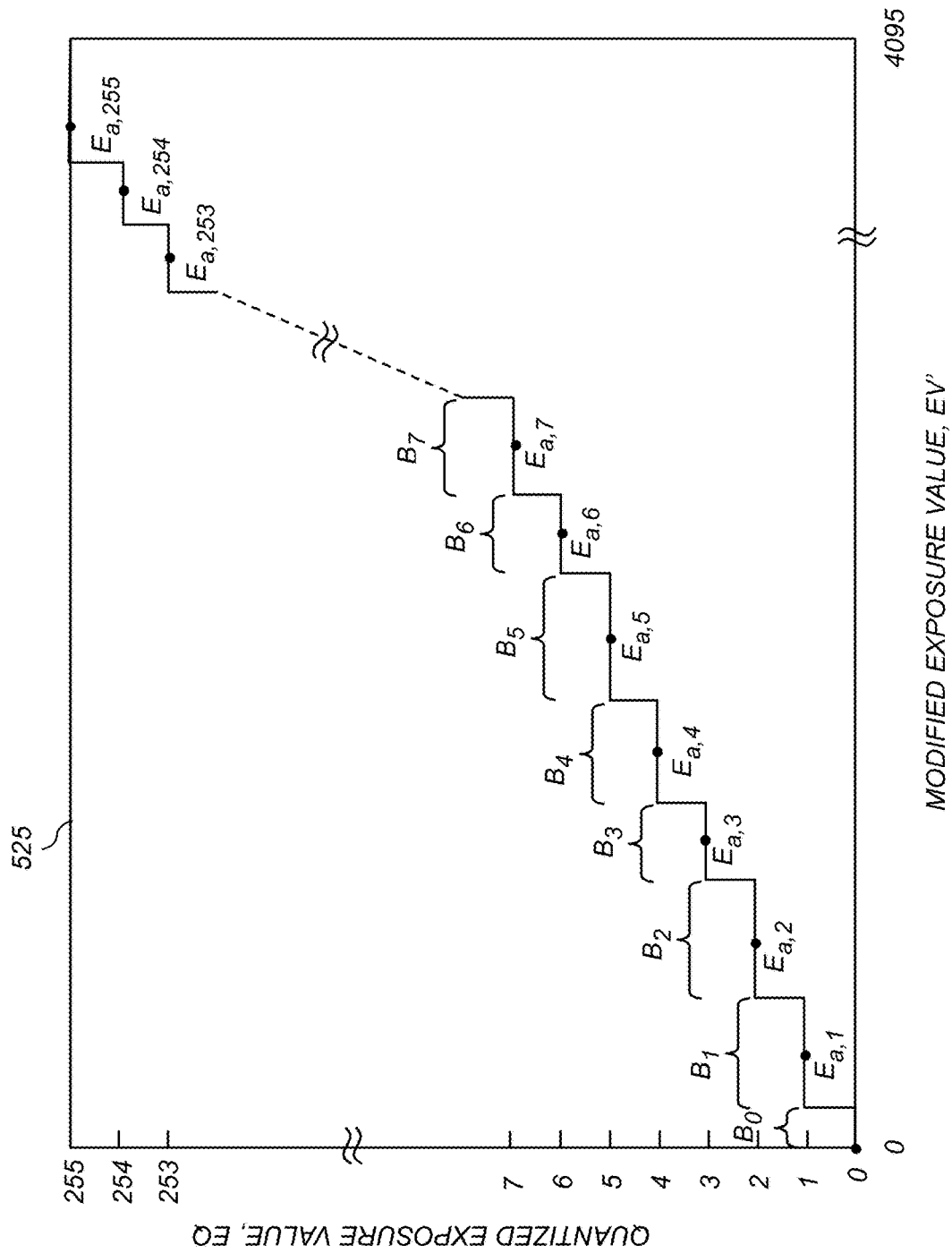
FIG. 5 illustrates an exemplary quantization look-up-table.

The interface to the printhead is typically an 8-bit number. As a result, it is necessary to use an apply quantization step 530 to determine a quantized exposure value 540 by applying an appropriate quantization LUT 525. To minimize quantization errors, a vector quantization process can be used to select the ranges of exposure values which are mapped to each of the quantized exposure values 540. Vector quantization processes are well-known in the art and any appropriate process can be used in accordance with the present invention. An example of a quantization LUT 525 is shown in FIG. 5. The quantization LUT 525 defines a set of bins $B_i$ that correspond to the range of modified exposure values that are mapped to the $i^{th}$ quantized exposure value. An aim exposure value $E_{a,i}$ can also be defined for each bin specifying an aim exposure value that is representative of the $i^{th}$ quantized exposure value. The set of aim exposure values define an aim exposure function 605, which can be represented as a vector $E_a$:

$$E_a = [E_{a,0}, E_{a,1}, \ldots E_{a,i}, \ldots E_{a,255}] \qquad (1)$$

Figure 6:
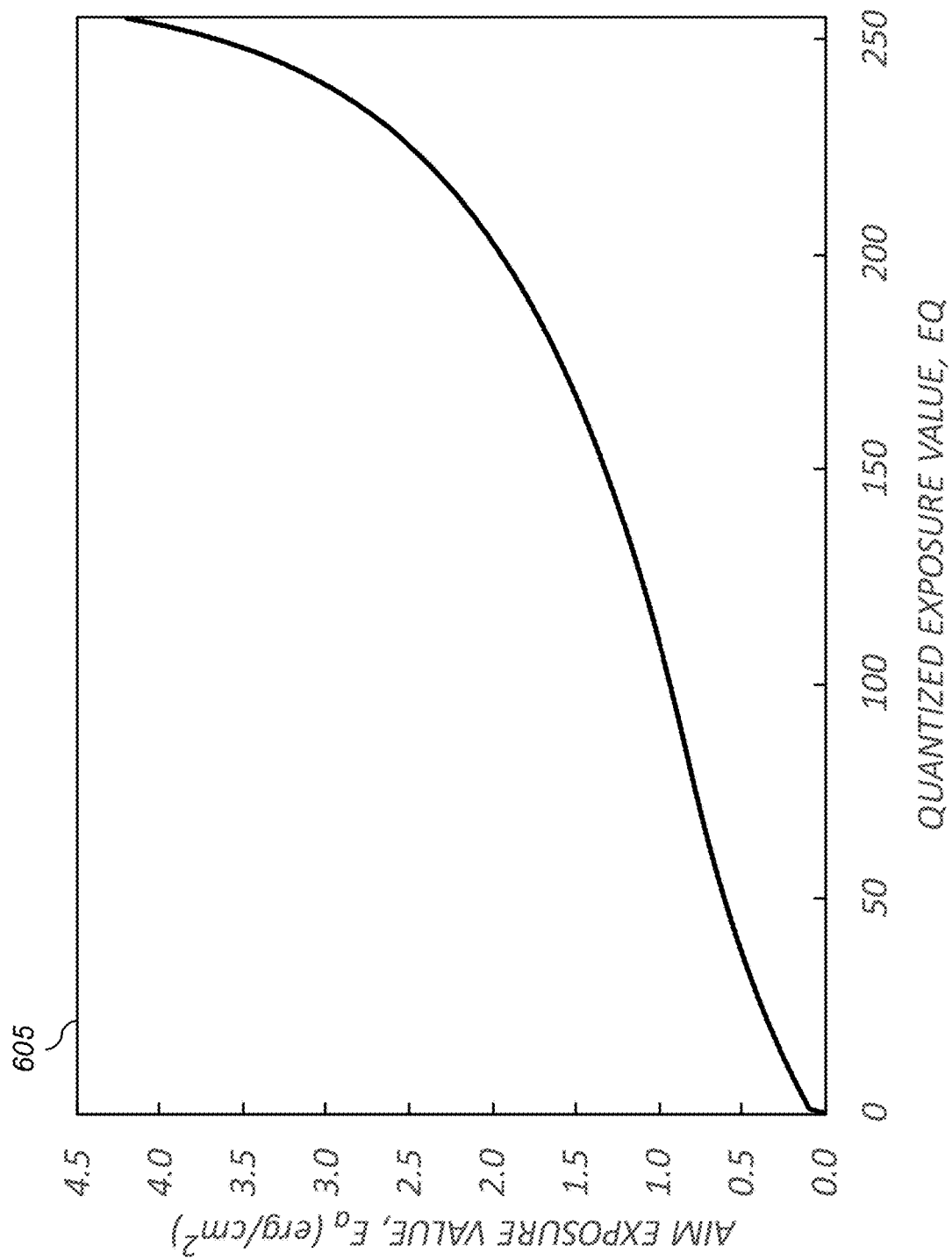
FIG. 6 illustrates an exemplary aim exposure function.

An exemplary aim exposure function 605 is illustrated in FIG. 6.

Over time, it has been found that the characteristics of the streak artifacts can change. Referring to FIG. 4, it is therefore desirable to perform a calibration process to determine the light-source-dependent gain correction values 515 on a periodic or as needed basis. For example, the calibration process can be performed at the beginning of each day, or can be initiated if an operator observes the presence of streak artifacts. Since the optimal quantization LUT 525 will be a function of the gain correction values 515, it is generally desirable to determine an updated quantization LUT 525 at the same time. In a preferred embodiment, a determine gain corrections process 590 is performed as part of the calibration process to determine the gain correction values 515 for each light source, the quantization LUT 525 and the corresponding aim exposure function 605.

The quantized exposure values 540 are passed to the printhead where they are used to control the exposure provided by the corresponding light sources. In an exemplary embodiment, a control light source exposure time step 550 controls the exposure by activating each light source in the printhead for an exposure time needed to provide the aim exposure value $E_{a,i}$ corresponding to the associated quantized exposure value 540.

Figure 7:
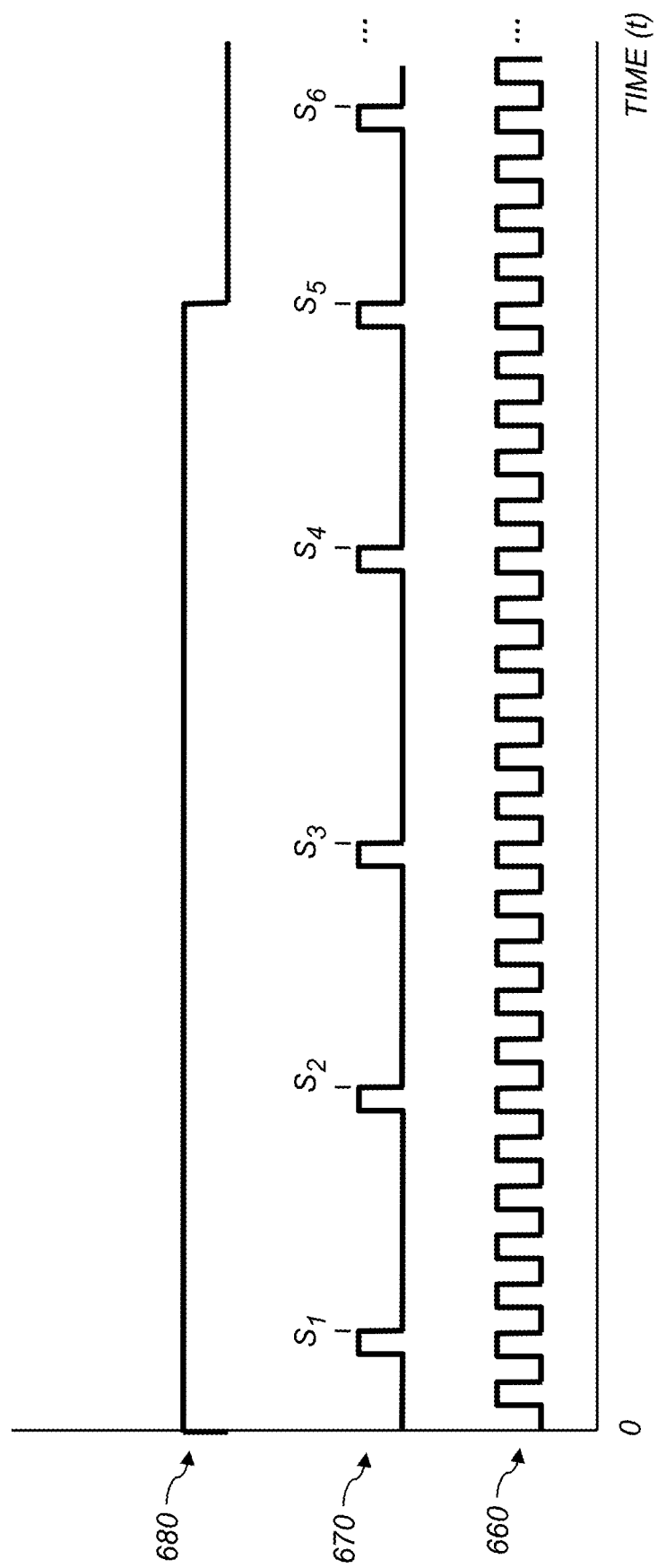
FIG. 7 is a graph illustrating how the master clock signal and the exposure clock signal are used to control the activation of a light source.

In some embodiments, the printhead has an associated master clock which provides a master clock signal 660 as shown in FIG. 7. For example, the master clock can run at 80 MHz. An exposure clock signal 670 is then formed having a stream of pulses formed by counting out a corresponding number of pulses in the master clock signal 660.

The exposure can then be controlled by activating the light source at time t=0, and then deactivating the light source after counting a number of exposure clock signal pulses corresponding to the quantized exposure value 540. The time (t) for the $i^{th}$ pulse is given by pulse time $S_i$. The set of pulse times for each of the quantized exposure values together define a pulse timing function 610 (S):

$$S=[S_0, S_1, \ldots S_i, \ldots S_{255}] \qquad (2)$$

In an exemplary configuration, the pulse times $S_i$ are represented in terms of the number of master clock pulses. FIG. 7 illustrates a light source activation function 680 corresponding to a quantized exposure value 540 of EQ=5 where the light source is activated at time t=0 and deactivated at time $S_5$ when the falling edge of the $5^{th}$ exposure clock signal pulse is detected.

In the simplest case, the power (i.e., the light output) provided by the light sources is constant during the time that the light source is activated so that the exposure will simply be proportional to the exposure time. However, it has been found that the power provided by the light source typically varies with time. To further complicate matters, the time dependency varies as a function of the pulse times which make up the exposure clock signal 670. For example, for some common driver chips used in LED printhead it has been found that when the pulses in the exposure clock signal 670 are closer together the light output is typically lower than when the pulses in the exposure clock signal 670 are farther apart.

Referring to FIG. 4, a determine pulse timing function process 600 is used to determine the pulse timing function 610 that will deliver the specified aim exposure function 605. To determine the pulse timing function 610 it is necessary to know the shape of the light output function in order to be able to compute the exposure provided to a particular exposure time. But, as has been discussed, the shape of the light output function depends on the pulse timing function 610. Consequently, it is not possible to determine the pulse timing function 610 using a straightforward process. In a preferred embodiment, the determine pulse timing function process 600 uses the method described in commonly-assigned U.S. Pat. No. 10,036,975 to Kuo et al., entitled "Determining a pulse timing function for a linear printhead," which is incorporated herein by reference.

The pulse timing function 610 that provides the specified aim exposure function 605 is typically a function of the printer configuration. For example, some printers can be configured to print at a variety of in-track spatial resolutions (e.g., 600 dpi or 1200 dpi). If the overall print speed is maintained to be the same, this means that the 1200 dpi pixels must be printed in half the time as the 600 dpi pixels. As a result, the associated pulse times will nominally be about half as long as well. This will typically have a significant impact on the shape the optimal pulse timing function 610. Therefore, in such cases, it can be necessary to determine an appropriate pulse timing function 610 for each of the relevant printer configurations. Each of the resulting pulse timing functions 610 can be stored and used when the printer is used in the corresponding configuration.

Returning to a discussion of FIG. 4, the pulse timing function 610 determined by the determined pulse timing function process 600 is used by a control light source exposure time step 550, which is applied in the printhead electronics 580 to control how long each of the individual light sources in the printhead is activated in response to the corresponding quantized exposure value 540.

In an exemplary embodiment, the same pulse timing function 610 is used for all of the light sources in the linear printhead. However, there will generally be differences between the light output of the different light sources when they are operated at the same current. This can result in various artifacts in the printed images such as streaks. To compensate for these artifacts, the current supplied to each light source can be adjusted using a control light source current step 560 to equalize the light output of the light sources. A calibration operation including a determine current control parameters process 700 can be performed to determine a set of current control parameters 710 that are used by the control light source current step 560 to control the current for each light source.

In some embodiments, the determine current control parameters process 700 can determine the current control parameters 710 by placing the printhead into a test fixture that includes a light sensor and measuring the light output for each light source. In this way, the current supplied to each light source can be adjusted until the light output from each light source is equalized to within a predefined tolerance.

In an exemplary embodiment, a plurality of driver chips is used to control the light sources in the printhead, wherein each driver chip controls an associated set of light sources. For example, a printhead in an exemplary printing system includes a linear array of 17,280 light sources that are controlled by 90 driver chips, where each driver chip controls 17,280/90=192 light sources. In this case, the printhead is divided into 45 segments along its length. Within each segment one driver chip controls the odd-numbered light sources, and a second driver chip controls the even-numbered light sources.

In an exemplary configuration, the current control parameters 710 include a global current control value ($V_{REF}$), a set of chip-dependent current control values ($C_{REF}$), and a set of source-dependent current control values ($D_{REF}$). The global current control value ($V_{REF}$) is a parameter which sets an overall current level $I_G$ which is supplied to all of the light sources in the printhead.

The chip-dependent current control values ($C_{REF}$) can be represented by an array of control values (one for each driver chip) that are used to independently adjust the current provided by each of the driver chips:

$$C_{REF}=[C_1, C_2, \ldots C_m, \ldots C_M] \qquad (3)$$

where M is the number of driver chips, and $C_m$ is the chip-dependent current control value for the $m^{th}$ driver chip. In an exemplary configuration, each $C_m$ value is a 4-bit integer ranging from 0-15 that specifies a gain adjustment in 3% increments. In this case, the chip-dependent gain adjustment can be expressed as $G_{c,m}=0.03\times(C_m-7)$.

The source-dependent current control values ($D_{REF}$) can be represented by an array of control values (one for each light source) that are used to independently adjust the current provided by each of the light sources:

$$D_{REF}=[D_1, D_2, \ldots D_n, \ldots D_N] \qquad (4)$$

where N is the number of light sources, and $D_n$ is the source-dependent current control value for the $n^{th}$ light source. In an exemplary configuration, each $D_n$ value is a 6-bit integer ranging from 0-63 that specifies a gain adjustment in 1% increments. In this case, the source-dependent gain adjustment can be expressed as $G_{d,n}=0.01\times(D_n-31)$.

The current supplied to each light source will be the global current as modified by the chip-dependent gain adjustment and the source-dependent gain adjustment. In equation form, the current supplied to the $n^{th}$ light source that is controlled by the $m^{th}$ driver chip is given by:

$$I_n = I_G(1 + G_{c,m} + G_{d,n}) \quad (5)$$
$$= I_G(1 + 0.03 \times (C_m - 7) + 0.01 \times (D_n - 31))$$

Figure 8:
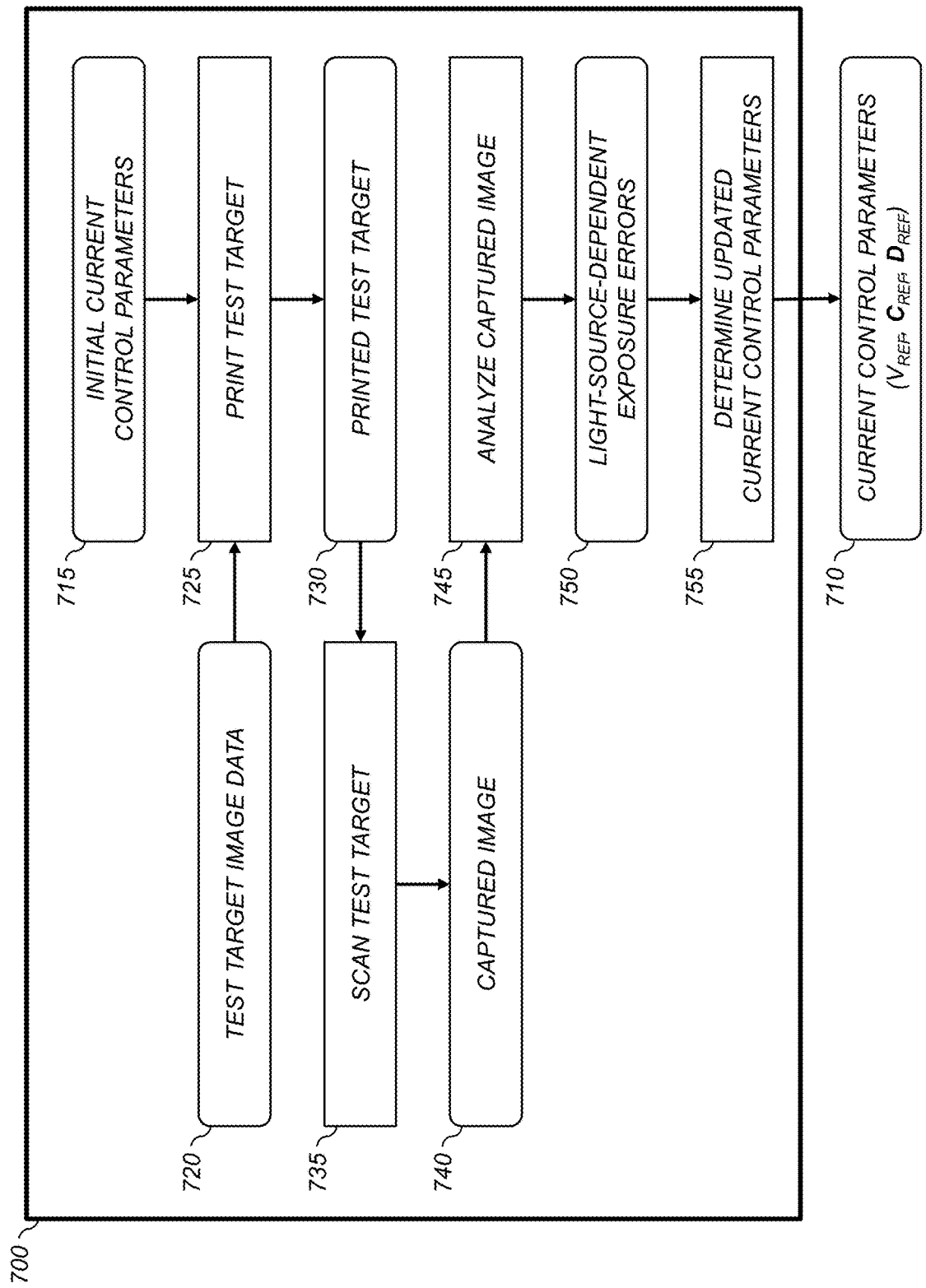
FIG. 8 is a flow chart of a process for determining current control parameters in accordance with an exemplary configuration.

FIG. 8 illustrates a flowchart of an exemplary embodiment of a determine current control parameters process 700 which determines the current control parameters 710 based on the analysis of a printed test target. In this process, the printhead is configured to use a set of initial current control parameters 715. The initial current control parameters 715 can be obtained in a variety of ways. For example, they can be a set of current control parameters determined using a test fixture that includes a light sensor and measures the light output for each light source as discussed earlier. Alternately, they can be a set of current control parameters determined using a previous calibration process.

Figure 9:
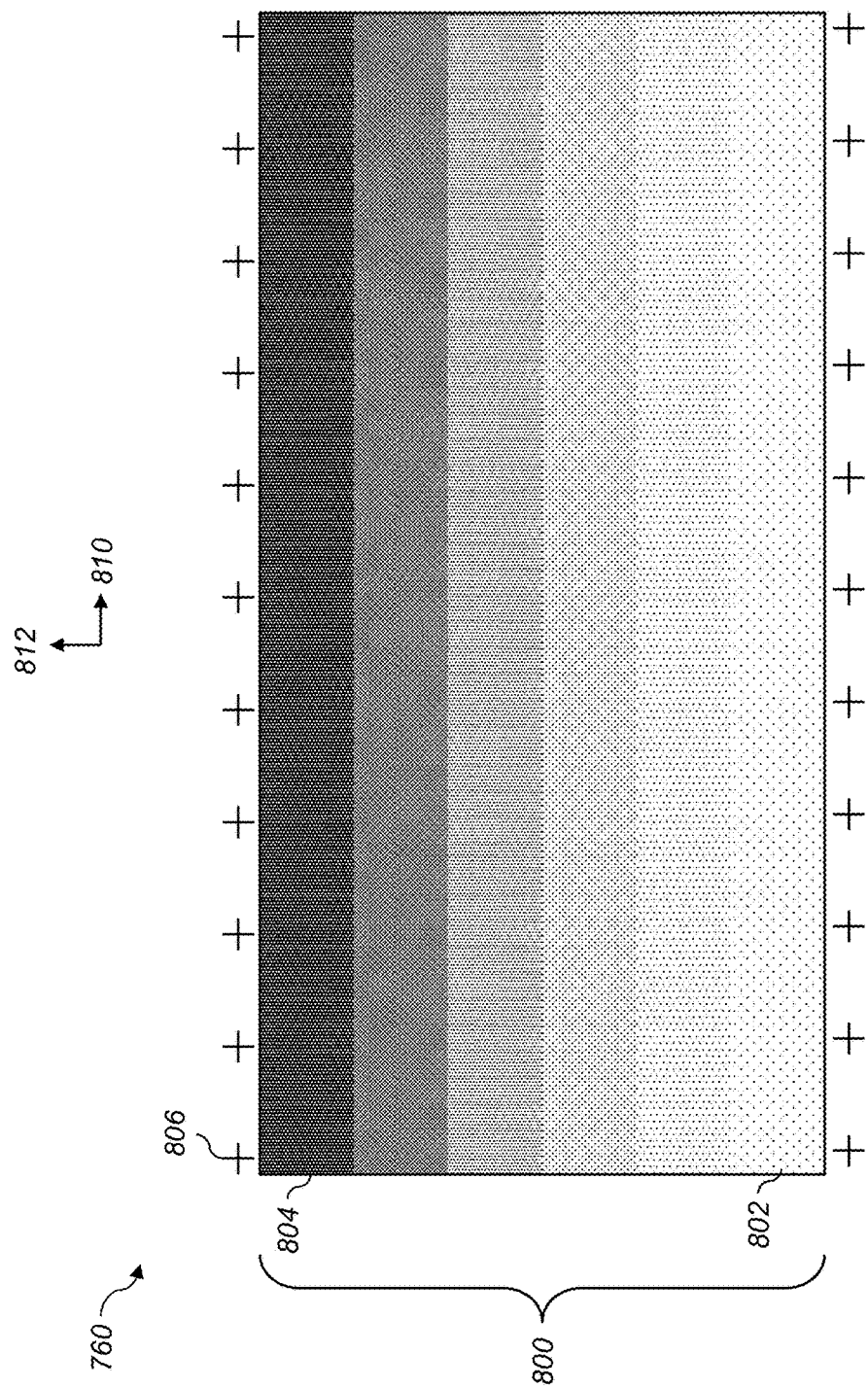
FIG. 9 shows an exemplary test target for use with the process of FIG. 8.

A print test target step 725 is used to print test target image data 720 for a test target 760 including one or more uniform patches to provide a printed test target 730. FIG. 9 illustrates an exemplary test target 760 that can be used in an exemplary configuration. The test target 760 includes a set of uniform patches 800, which span the width of the printhead in the cross-track direction 810. Each uniform patch 800 is positioned at a different in-track position in the in-track direction 812. Each of the uniform patches 800 has a different density level ranging from a lightest uniform patch 802 to a darkest uniform patch 804. The test target 760 also includes a set of alignment marks 806 having known positions relative to the printhead that can be used to determine the alignment of the printed test target to the printhead.

Generally, continuous tone digital image data for the test target 760 is processed through a halftoning process before it is printed to provide halftoned image data. In an exemplary configuration, the halftoning process is a stochastic halftoning process. The use of a stochastic halftoning process is advantageous because its characteristics are more isotropic and less prone to moiré artifacts during the image capture process. The halftoned image data is then printed using the process of FIG. 4. Preferably, during the process of determining the current control parameters 710, the gain correction values 515 are all set to unity values so that no gain corrections are applied by the apply gain corrections step 520.

The printed test target 730 produced by the print test target step 725 is next digitized using a scan test target step 735. The scan test target step 735 uses a digital image capture system 440 (FIG. 3) to provide a captured image 740 of the printed test target 730. In a preferred embodiment, the digital image capture system 440 is a digital camera system or an optical scanner system that is integrated into the digital printing system. In some configurations the digital image capture system 440 is used to automatically capture the image of the printed test target 730 as it travels through the digital printing system.

Figure 10:
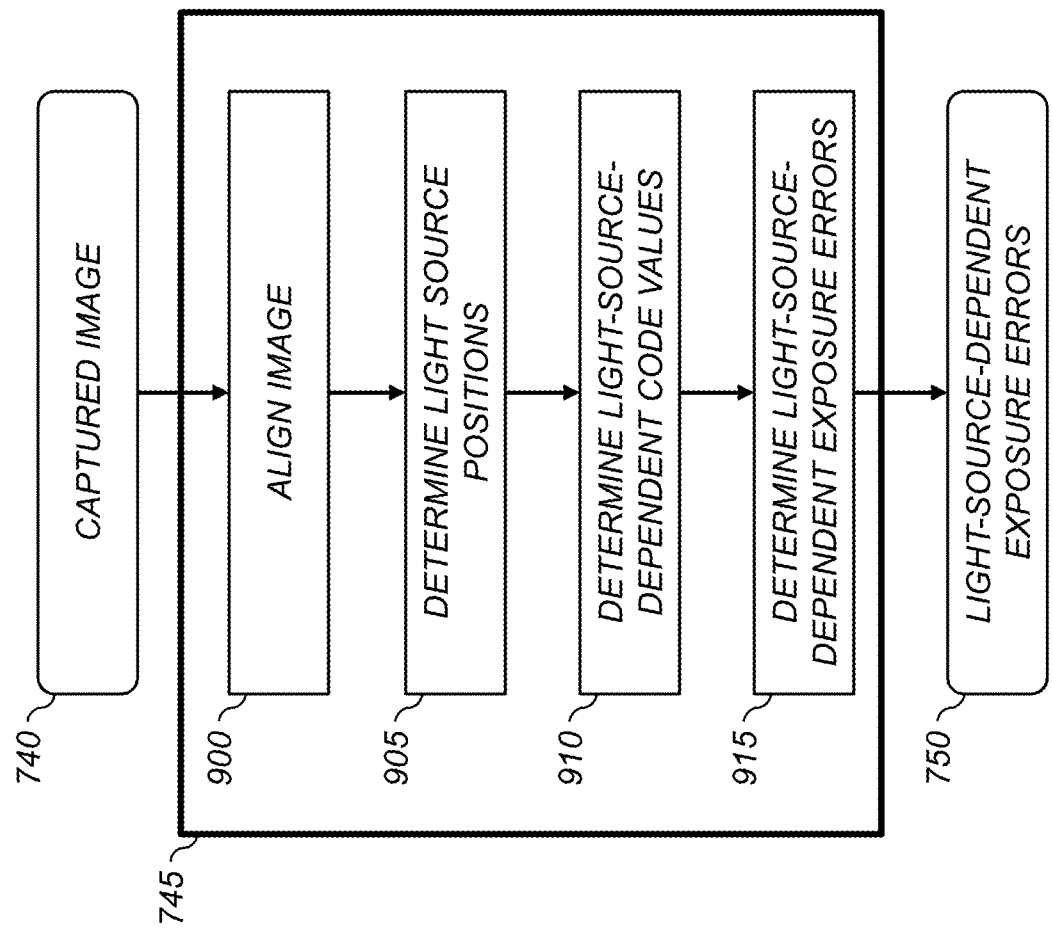
FIG. 10 is a flow chart showing additional details of the analyze captured image step of FIG. 8.

An analyze captured image step 745 is next used to analyze the captured image 740 to determine estimated light-source-dependent exposure errors 750. FIG. 10 shows a flowchart for an exemplary process that can be used to perform the analyze captured image step 745. First, an align image step 900 is used to detect the locations of the alignment marks 806 (FIG. 9) and remove any skew from the captured image 740. A determine light source positions step 905 determines a cross-track position of each light source within the image based on the detected locations of the alignment marks 806.

Figure 11:
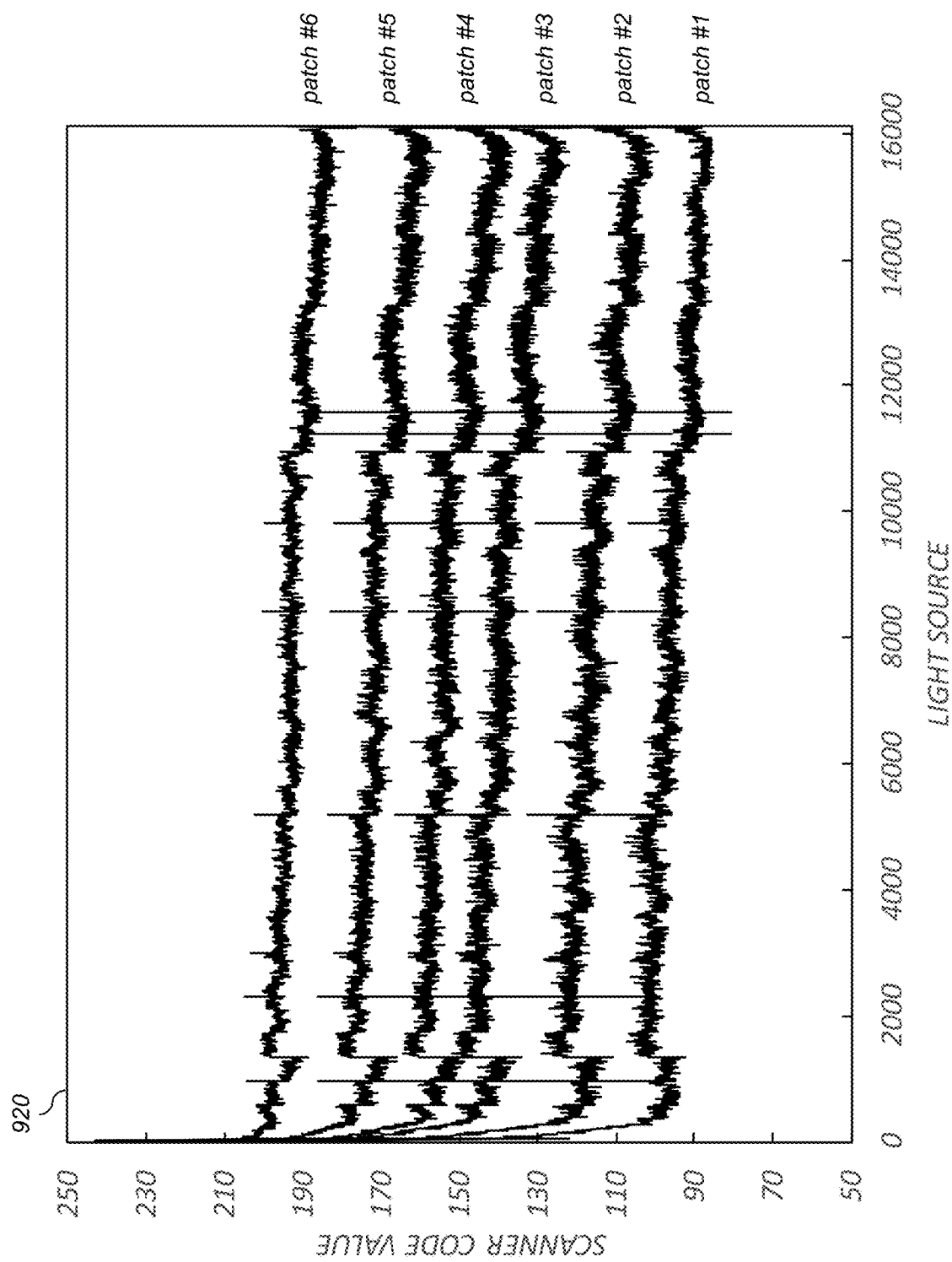
FIG. 11 shows an exemplary set of measured test patch data.

A determine light-source-dependent code values step 910 is then used to determine an average code value within each uniform patch 800 for each light source. This is done by averaging the code values in a vertical column within the uniform patch at the determined cross-track position for the light source. FIG. 11 shows a graph 920 illustrating a sample set of curves showing the scanner code value as a function of light source for a set of six uniform patches. (Note that a set of light sources on either end of the head were outside the active printing area of the printing system so that the number of light sources in the graph 920 is less than the total number of light sources in the printhead.)

Figure 12:
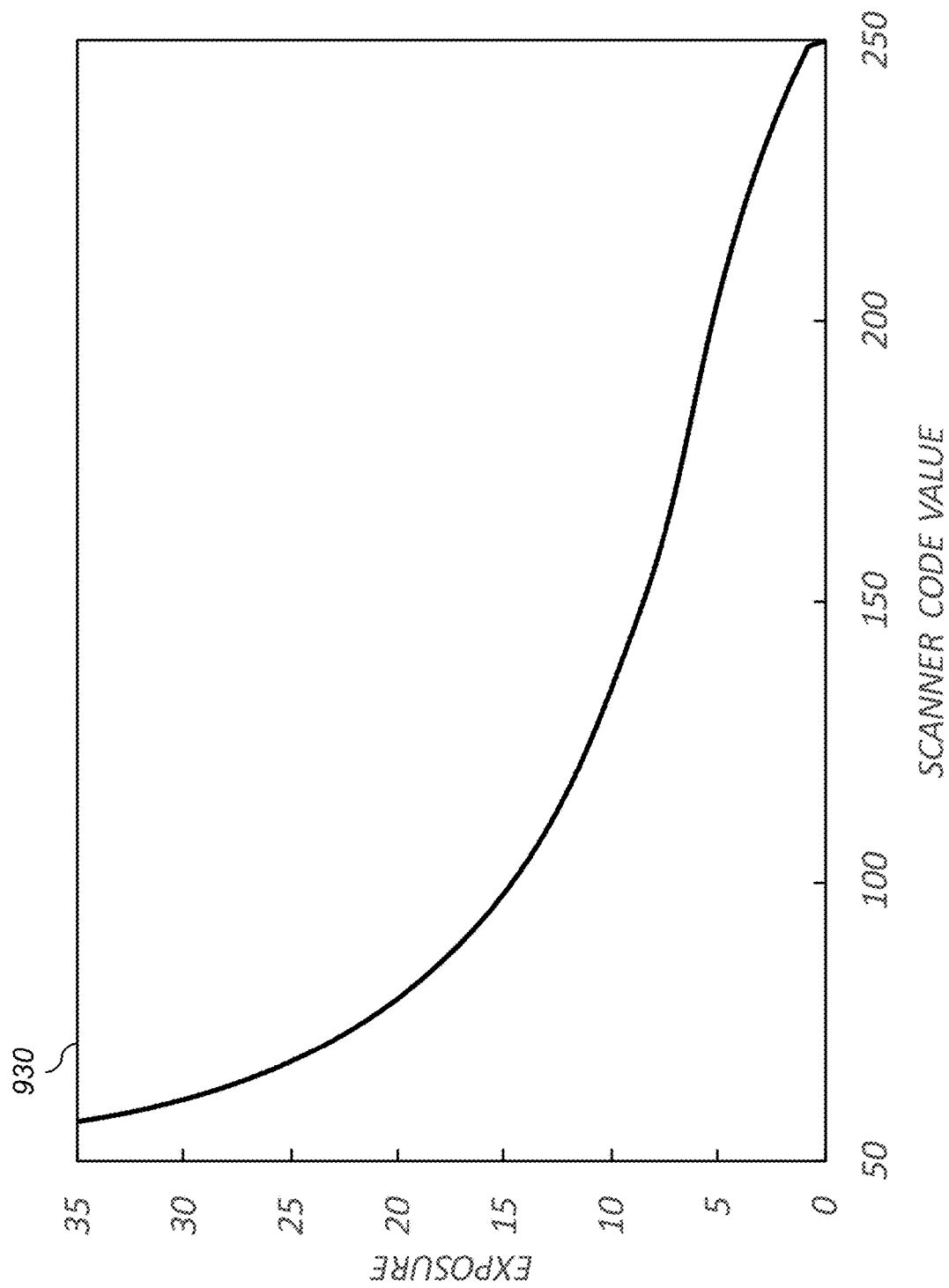
FIG. 12 shows an exemplary calibration function relating scanner code values to estimated exposure values.

Returning to a discussion of FIG. 10, a determine light-source-dependent exposure errors step 915 is then used to determine corresponding estimated light-source-dependent exposure errors 750. In an exemplary configuration, the digitized scanner code values are mapped to exposure values by applying a calibration curve 930 such as that shown in FIG. 12. The calibration curve 930 can be determined by printing patches having known exposures and measuring the resulting code values in a scanned image. Note that the "exposure" values in FIG. 12 and subsequent plots are the exposure times that the light source is activated in units of microseconds. These values will be proportional to the actual exposure, which can be determined by multiplying these values by the power of the light source (which is about 180 picowatts).

Figure 13:
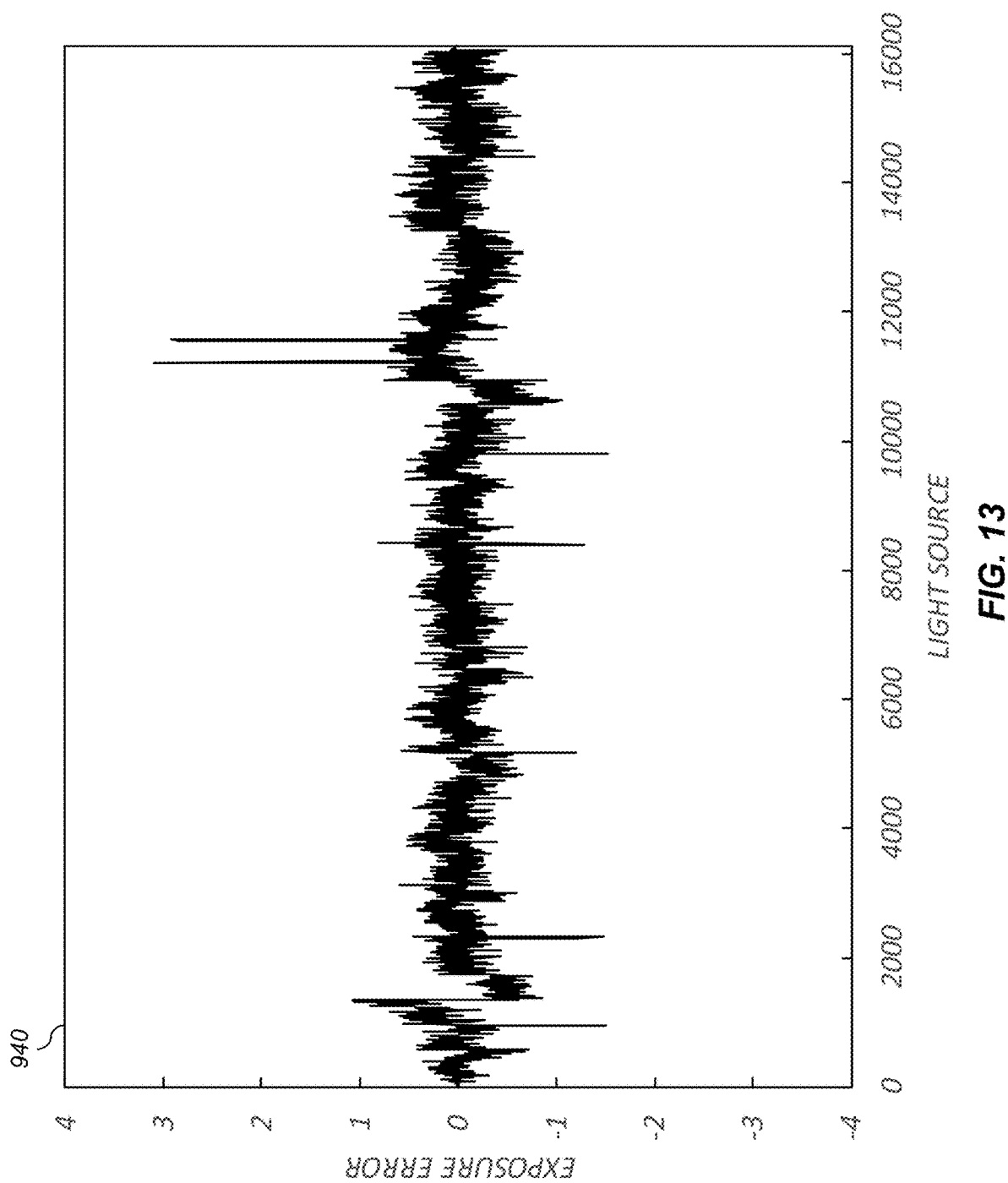
FIG. 13 a graph showing the estimated exposure error as a function of light source for a particular test patch.

To evaluate the exposure errors, the measured exposure values vs. light source functions can be smoothed (e.g., by fitting a spline function) to determine a set of smoothed exposure values. The difference between the smoothed and unsmoothed functions will be an estimate of the exposure errors for each of the light sources. FIG. 13 shows a graph 940 showing the estimated exposure error as a function of light source for one of the uniform patches 800 (FIG. 9).

Figure 14:
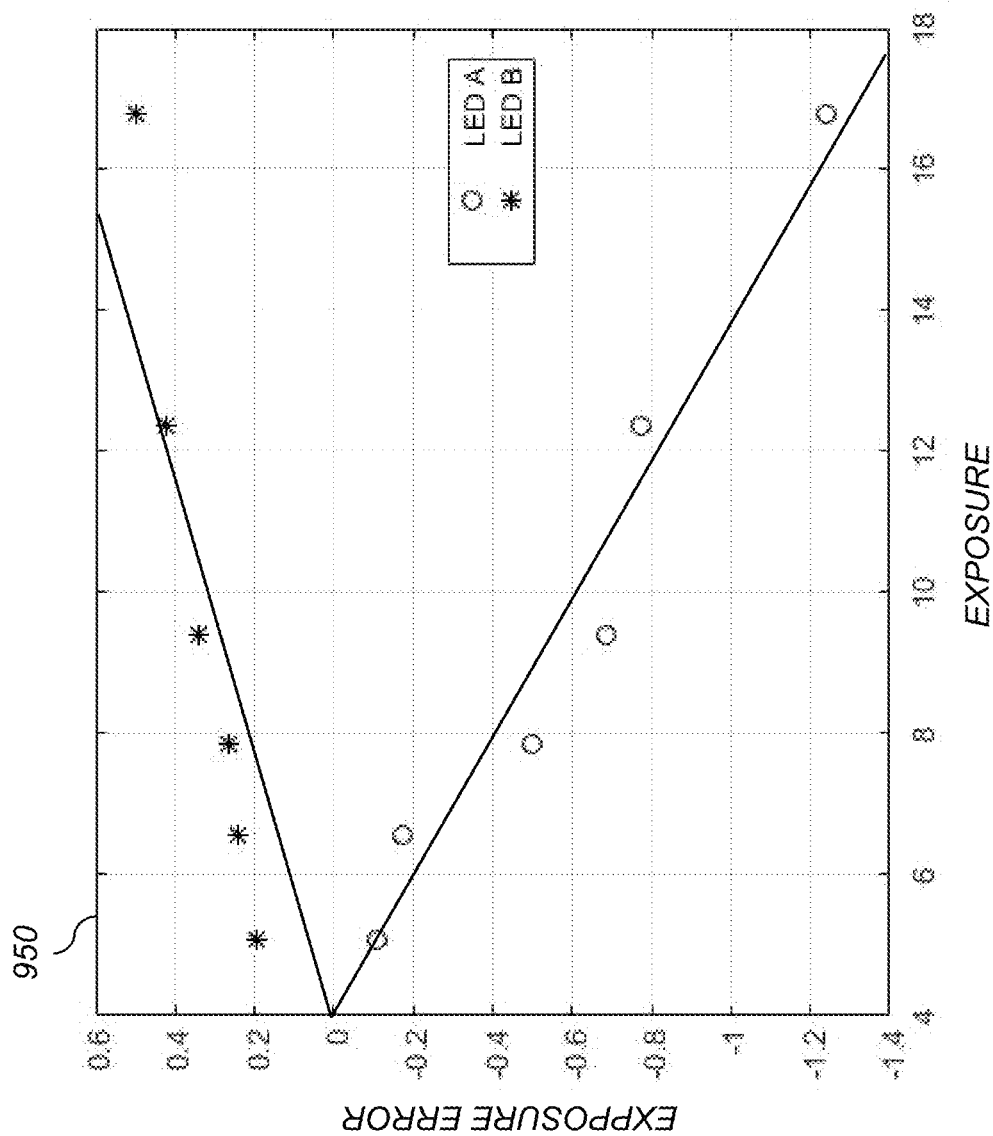
FIG. 14 is a graph showing the estimated exposure error for a particular light source.

Returning to a discussion of FIG. 8, a determine updated current control parameters step 755 is next used to determine the updated current control parameters 710. In an exemplary embodiment, an exposure gain error is determined for each of the light sources by combining the estimated exposure errors for each of the uniform patches 800. FIG. 14 is a graph 950 showing the estimated exposure error determined from the six uniform patches 800 (FIG. 9) for two of the light sources (i.e., "LED A" and "LED B"). A linear function can be fit to the points for each light source to provide an estimated gain error. In a preferred embodiment, the linear function is constrained to go through the origin, and the slope of the resulting linear function is therefore an estimate of the exposure gain error. A positive slope indicates that the light source is providing too much exposure and a negative slope is an indication that the light source is providing too little exposure.

Figure 15:
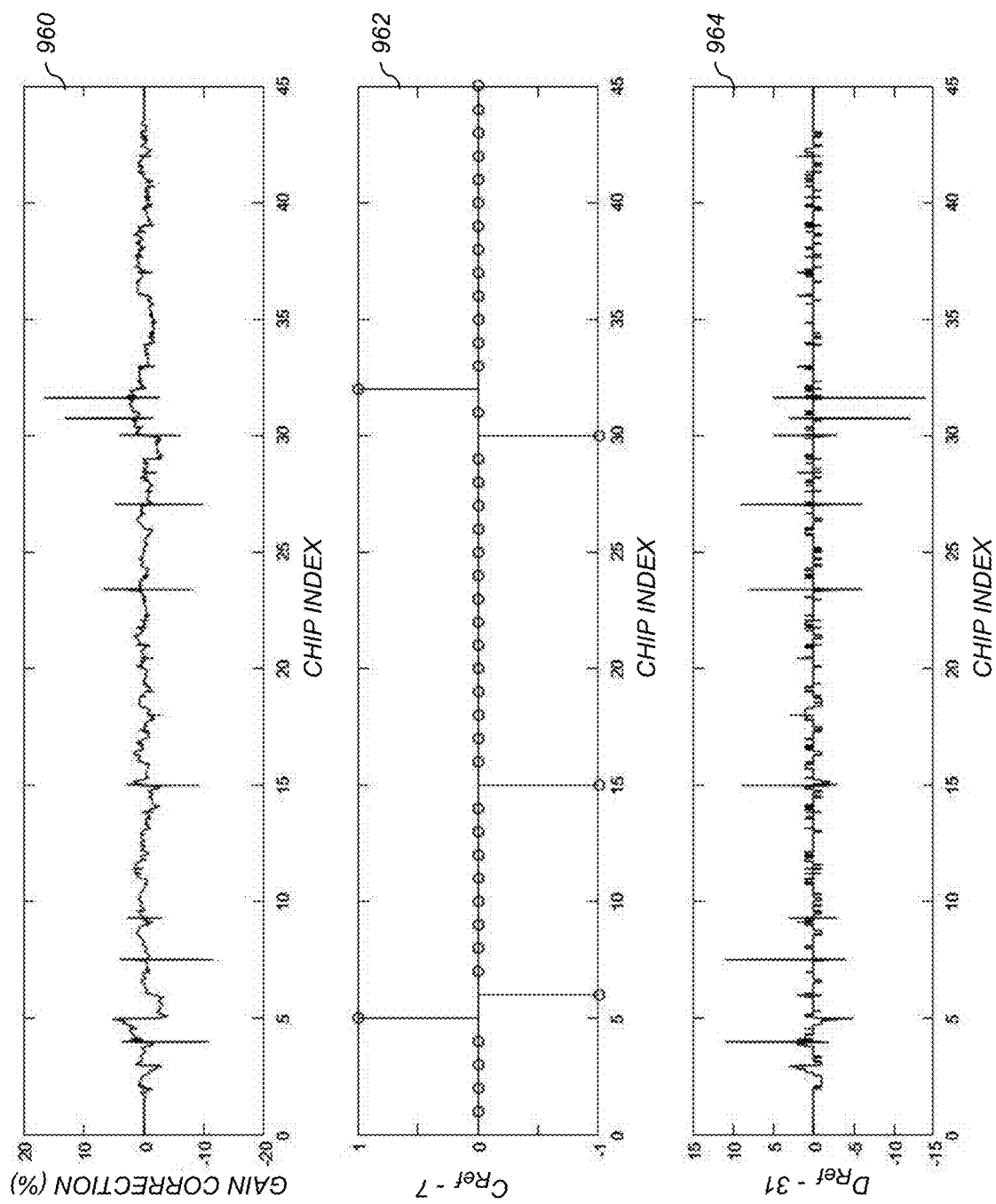
FIG. 15 is a graph illustrating an exemplary set of gain corrections.

FIG. 15 shows a graph 960 illustrating an exemplary set of gain corrections determined for each of the light sources. (In this plot, the x-axis has been scaled to the number of control chips across the printhead.) These gain corrections can then be combined with the gain values associated with the initial current control parameters 715 (FIG. 8) to determine an updated set of gain adjustment values. The updated gain adjustment values are then used to determine a corresponding set of current control parameters 710.

In an exemplary configuration, the global current control value ($V_{REF}$) is not adjusted during this process, so the same value is used as in the initial current control parameters.

Rather, the value of the global current control value ($V_{REF}$) is set to produce the desired maximum exposure level at a quantized exposure value 540 of EQ=255. To determine the set of chip-dependent current control values ($C_{REF}$) for the updated current control parameters 710, the gain adjustment values associated with each of the control chips are averaged and quantized into bins associated with the available chip-dependent current control values ($C_m$). The associated chip-dependent gain adjustment is calculated for each control chip (e.g., using the equation $G_{c,m}=0.03\times(C_m-7)$) and is subtracted from the gain adjustment values to determine residual gain adjustment values. The residual gain adjustment values for each light source are quantized into bins associated with the available source-dependent current control value ($D_n$). The chip-dependent current control values ($C_m$) are used to form the vector of chip-dependent current control values ($C_{REF}$) and the source-dependent current control values ($D_n$) are used to form the source-dependent current control values ($D_{REF}$) for the updated current control parameters 710. A plot of the resulting chip-dependent current control values is shown in graph 962, and a plot of the resulting source-dependent current control values is shown in graph 964.

Once the updated current control parameters 710 are determined, they are stored in a processor-accessible memory for use in printing subsequent digital image data. In some embodiments, the determine current control parameters process 700 of FIG. 8 can be performed iteratively to further refine the gain corrections, where the updated current control parameters 710 are used as the initial current control parameters for the next iteration. For example, the determine current control parameters process 700 can be repeated until the determined light-source-dependent exposure errors 750 are all less than a predefined threshold value.

Returning to a discussion of FIG. 4, in an exemplary embodiment, the determine current control parameters process 700 is performed in the factory to determine a set of current control parameters 710 that are stored in the printing system when it is shipped to a customer. Typically, the determine gain corrections process 590 will be used in the field to correct for any streak artifacts that arise in the printed images (e.g., due to degradation of the printhead or other components such as the charging subsystem 210 or the development subsystem 225). However, the determine current control parameters process 700 can also be performed in the field on an as-needed basis. For example, the determine current control parameters process 700 can be performed when a new printhead is installed or when a service technician observes that performance degradations have occurred. When the determine current control parameters process 700 is performed, the gain correction values 515 and the quantization LUT 525 are typically set to nominal values. After the updated current control parameters 710 are determined, the determine gain corrections process 590 can be performed to correct for any residual errors that may remain.

As was discussed earlier with respect to FIG. 6, it has been found that different pulse timing functions 610 may be needed to provide a defined aim exposure function 605 depending on the printer configuration. In particular, different pulse timing functions 610 will typically be needed for different print modes having different line print times (i.e., the time it takes for the printhead to print a line of image data). The line print time will define the maximum pulse time that can be used for the pulse timing function 610, which will in turn have a significant effect on the light output function. The aspects of the print mode that will have a direct impact on the line print time will be the in-track printer resolution (i.e., the number of lines/inch that are printed in the in-track direction), and the print speed (i.e., the number of pages/minute that are printed). For example, doubling the in-track printer resolution or doubling the print speed will have the effect of reducing the line print time by a factor of 2×.

In an exemplary embodiment, the printing system is adapted to print at a set of different print modes having the following characteristics:

TABLE 1

Exemplary Print Modes

| Print Mode | In-Track Printer Resolution (lines/inch) | Print Speed (pages/minute) | Line Print Time (μsec) |
|---|---|---|---|
| 1 | 1200 | 83 | 21.1 |
| 2 | 1200 | 100 | 17.5 |
| 3 | 600 | 83 | 42.2 |
| 4 | 600 | 100 | 35.0 |
| 5 | 600 | 120 | 29.2 |
| 6 | 300 | 83 | 84.4 |
| 7 | 300 | 100 | 70.0 |
| 8 | 300 | 120 | 58.4 |
| 9 | 300 | 140 | 50.0 |
| 10 | 300 | 166 | 42.2 |

Each of these print modes has a different line print time, and as a result requires a different pulse timing function 610 in order to provide a defined aim exposure function 605.

In some embodiments, a user interface can be provided (e.g., in a pre-processing module 305) that enables a user to select a different print mode on a job-by-job basis. Therefore, in a preferred embodiment, a mechanism is provided to select the appropriate pulse timing function to be used with each print job. For example, FIG. 16 shows an exemplary user interface 970 having user selectable options for specifying aspects of a print mode. In this example, the user selections for specifying the print mode include a resolution selection 972 for selecting an in-track printer resolution and a print speed selection 974 for selecting a print speed. While the resolution selection 972 and the print speed selection 974 are shown with numerical choices, in other embodiments text labels could be used. For example, the 1200 lines/inch printer resolution could be labeled "MaxHD" and the 600 lines/inch printer resolution could be labeled "Classic."

In some embodiments, only certain combinations of the printer resolution and the print speed may be permitted. For example, if a 1200 lines/inch printer resolution is selected, the print speed choices may be limited to 82 pages/minute or 100 pages/minute so that the 120 pages/minute and 140 pages/minute selections are dimmed out. In some embodiments, the user interface 970 can also include other selections for controlling other attributes of the print job (e.g., number of copies to print, pages to print, type of halftoning to be applied, etc.).

Figure 17:
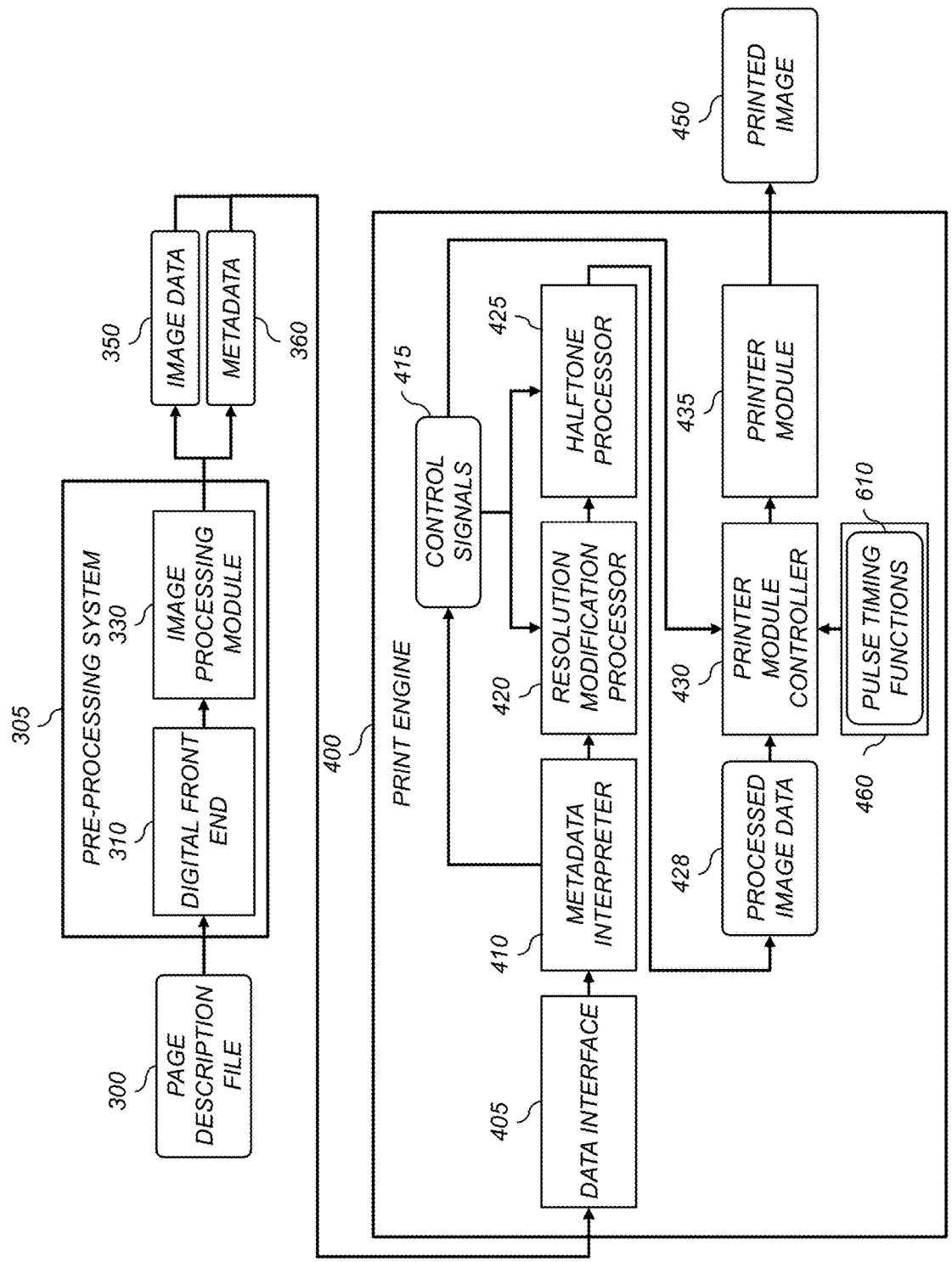
FIG. 17 shows a processing path including a print engine that is adapted to produce printed images from image data using a plurality of print modes.

FIG. 17 shows a processing path including a print engine 400 that is adapted to produce printed images from image data 350 using a plurality of print modes. This processing path represents an extension of that described in the aforementioned U.S. Pat. No. 10,062,017 to Kuo et al. In this configuration, the pre-processing system 305 provides image data 350 as well as associated metadata 360. In a preferred embodiment, the metadata 360 includes print mode metadata that provides an indication of the print mode that is to be used to print the image data 350. In an exemplary configuration, the print mode metadata can be an integer specifying a print mode from a predefined set of print modes such as those shown in Table 1. In other configurations, the print mode metadata can include various parameters specifying various attributes of the print mode, such as a printer resolution parameter and a print speed parameter that are specified using user interface 970 (FIG. 16). The metadata 360 can also include other parameters such as image resolution metadata and halftoning state metadata.

The print engine 400 receives the image data 350 and the metadata 360 using an appropriate data interface 405 (e.g., an Ethernet interface). The print engine includes a metadata interpreter 410 that analyzes the metadata 360 to provide appropriate control signals 415 that are used to control various aspects of the print engine 400. In an exemplary configuration, the control signals include resolution modification control signals that are used to control a resolution modification processor 420 and halftone algorithm control signals that are used to control a halftone processor 425 as described in the aforementioned U.S. Pat. No. 10,062,017 to Kuo et al. The resolution modification processor 420 and the halftone processor 425 are used to process the image data 350 to provide processed image data 428, which is in an appropriate state to be printed by the printer module 435. A printer module controller 430 then controls the printer module 435 to print the processed image data 428 to produce the printed image 450.

In a preferred embodiment, the control signals 415 include a pulse timing function selection parameter which is used to select a pulse timing function 610 (FIG. 4). The metadata interpreter 410 determines the pulse timing function selection parameter responsive to metadata 360 that specifies the print mode to be used to print the image data 350. In an exemplary configuration, the print mode metadata includes an in-track printer resolution parameter that specifies an in-track printer resolution (e.g., 600 lines/inch or 1200 lines/inch) and a print speed parameter that specifies a print speed (e.g., 83 pages/minute, 100 pages/minute or 120 pages/minute). As illustrated in Table 1, a set of print modes can be defined corresponding to allowable combinations of these parameters, each print mode having an associated line print time. In addition to selecting a pulse timing function 610, the control signals 415 determined from the print mode metadata can also include parameters for controlling other aspects of the printer module 435. For example, the control signals 415 can be used to select a set of current control parameters 710 (FIG. 4) appropriate for the selected print mode, and to adjust the speed of various motors to control the print speed.

The pulse timing functions 610 for each of the print modes are preferably pre-determined using the method of FIG. 8 for the line print times associated with each of the supported print modes and stored in a processor-accessible digital memory 460.

In some scenarios it is desirable to provide high-speed print modes that give faster printing speeds, even if it is necessary to compromise on some aspect of image quality such as pixel resolution. As the printing speed of the digital printing press continues to increase, the physical requirements of the digital printhead parallel to the printing direction will become more stringent. At a particular spatial pixel resolution (e.g., 1200×1200 dpi), the actual time allocated to each printhead LED pixel, denoted as $T_L$, is inversely proportional to the printing speed. Furthermore, $T_L$ will impose a constraint on the image data load time, $T_{data}$, and the LED exposure time, $T_{expo}$. (Note that the LED exposure time, $T_{expo}$, is the same as the "Line Print Time" in Table 1.) In the case where data loading and exposure processes run in parallel:

$$T_L \geq T_{data}$$

$$T_L \geq T_{expo} \qquad (6)$$

Or if serial data loading and exposure processes are used:

$$T_L \geq (T_{data} + T_{expo}) \qquad (7)$$

To provide high speed print modes, a common solution adopted by digital printing systems is to use to a lower spatial resolution in order to increase $T_L$. For example, the in-track resolution can be decreased from 1200 dpi, which would increase the $T_L$ by a factor of 2×, or to 900 dpi which would increase the $T_L$ by a factor of 1.33×.

In some high-speed print modes only the in-track resolution is decreased, while in other cases both the in-track and cross-track resolution is decreased. When the cross-track resolution is decreased, in some embodiments the pixel data can be replicated in order to control adjacent light sources. For example, if the printhead has a resolution of 1200 LEDs/inch and image data is provided at a cross-track resolution of 600 dpi, then each 600 dpi pixel can be replicated to control 2 LEDs.

In other embodiments, when the cross-track resolution is decreased, only a subset of the light sources is used. For example, every other LED can be used to print the 600 dpi image data, while the other LEDs are unused. However, this approach is not compatible with some conventional printing system architectures.

The standard process for a digital printing system development is to compartmentalize each subsystem design specification to meet the targeted overall system requirements, such as printing speed, rendering resolution, substrate specifications, etc. For example, the highest print speed and resolution will dictate the electronic and physical design requirement for the digital printhead. While this approach allows each subsystem to be independently optimized, it often compels each subsystem to choose a simple architecture with a rigid interface defined with other imaging subsystems. This further restricts the parametric space for overall system optimization. For example, in the architecture of FIG. 17, the input to the printer module 435 conventionally requires that the processed image data 428 be supplied with a cross-track image resolution corresponding to the native printhead resolution (e.g., 1200 dpi), irrespective of the desired printing resolution. This limitation arises from the serial data loading process that is used to populate the image data into the printhead. For example, if it is desired to print at a resolution of 300 dpi, the image data must be up-sampled to 1200 dpi before it is loaded into the printhead. And since the architecture requires that the resolution modification be applied using the resolution modification processor 420 prior to applying the halftoning operation using the halftone processor 425 in order to avoid moiré artifacts, this also imposes the constraint that the halftoning operation must be applied at the native printhead resolution. This can be computationally inefficient, and it also places constraints on the image data load time, $T_{data}$, because it is necessary to load image data for all of the light sources.

The present invention enables image data to be efficiently loaded into the printhead at a variety of different cross-track image resolutions. With the ability to dynamically adjust the effective cross-track imaging resolution of the printhead, the DFE 310 can automatically choose to render the image data 350 in a lower resolution. This will improve the overall system throughput by reducing the computational burden on the DFE 310 and the other image processing modules (e.g., the resolution modification processor 420 and the halftone processor 425) in lower resolution print modes, and also enables the image data load time to the printhead to be reduced. This enables the digital printing system to improve the printing speed associated with the low-resolution print modes while satisfying the desired level of image quality. Furthermore, this approach enables a lower frequency halftone screen option to be used for the low-resolution print modes to achieve higher image quality consistency.

Figure 18:
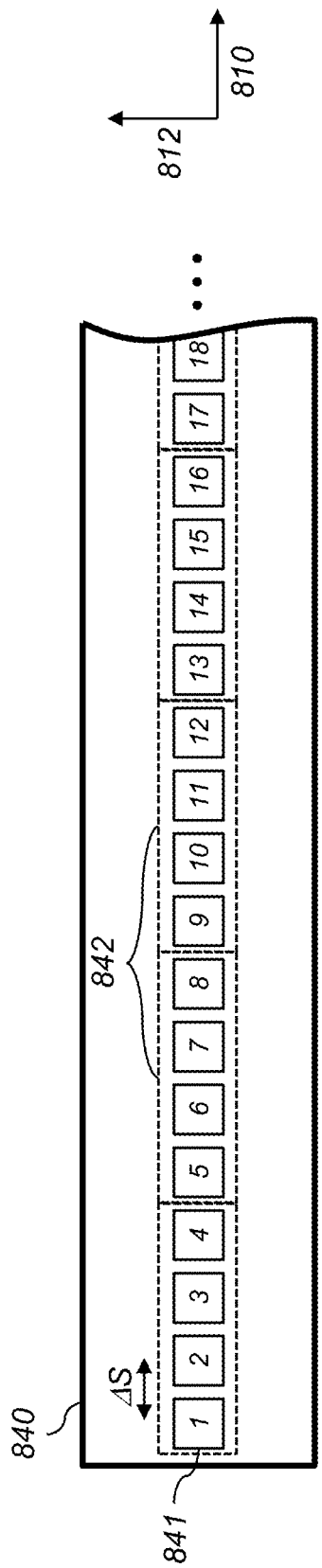
FIG. 18 illustrates a printhead having a linear array of light sources.

The present invention uses hierarchical linear printhead design to enable efficient printing in a plurality of print modes having different cross-track resolutions. FIG. 18 illustrates a printhead 840 having a linear array of light sources 841 separated by a light source spacing $\Delta S$ (e.g., a center-to-center spacing between adjacent light sources). In accordance with an exemplary embodiment, the printhead 840 is divided into N sections 842, where the size of the sections 842 corresponds to the light source spacing in the lowest resolution print mode. In an exemplary embodiment, the printhead has a 1200 dpi resolution so that $\Delta S=\frac{1}{1200}$ inches, and the set of supported print modes have cross-track resolutions of 300 dpi, 600 dpi and 1200 dpi such that the sections 842 each include 1200/300=4 light sources.

In a preferred embodiment, the supported print modes utilize a dyadic printing resolution progression having a set of cross-track resolutions which differ by a factor of 2 (e.g., 300 dpi, 600 dpi, 1200 dpi), although this is not a requirement. If the dyadic sequence include K different resolutions (in this case K=3), then the number of light sources 841 in each section 842 will be $2^{K-1}$, and the total number of the light sources in the printhead 840 will be $N \times 2^{K-1}$.

Figure 19A:
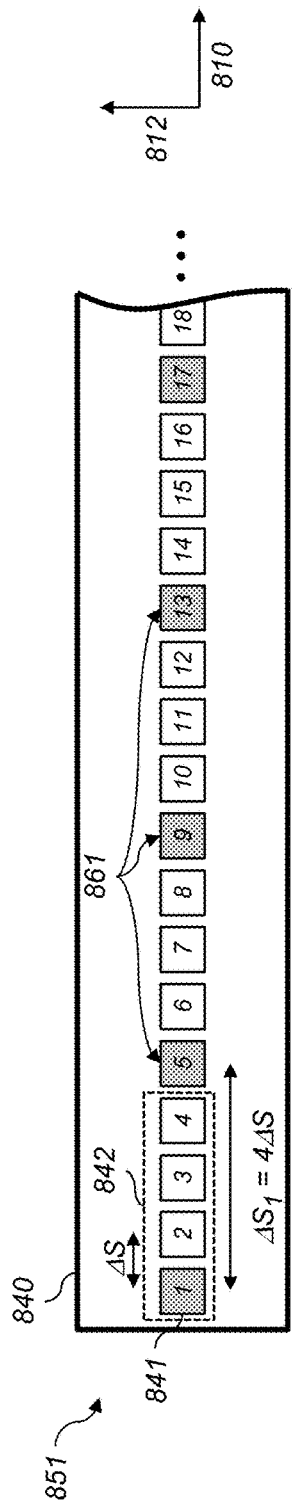
FIG. 19A illustrates a first subset of light sources used in a first print mode.
Figure 19B:
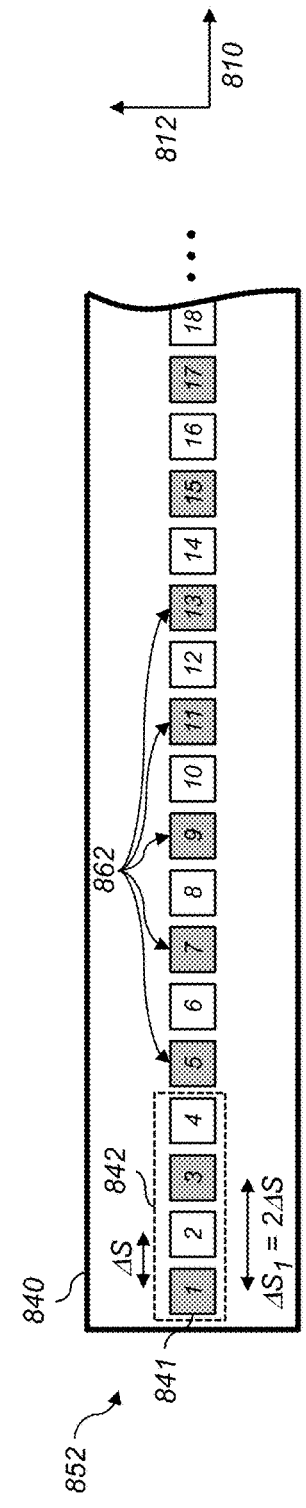
FIG. 19B illustrates a second subset of light sources used in a second print mode.
Figure 19C:
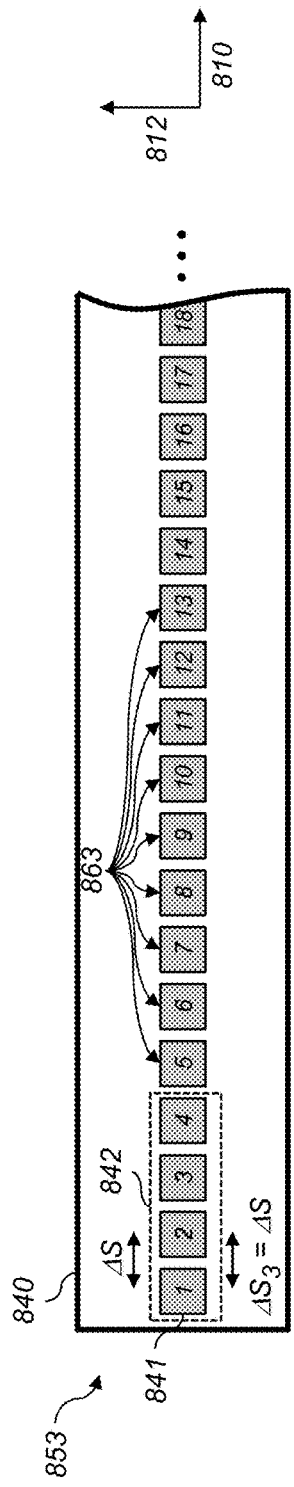
FIG. 19C illustrates a third subset of light sources used in a third print mode.

FIGS. 19A-19C illustrate a sequence of print modes 851, 852, 853 in a dyadic sequence having cross-track resolutions of 300 dpi, 600 dpi, 1200 dpi, respectively, according to an exemplary embodiment. The first print mode 851 shown in FIG. 19A utilizes a first subset of light sources 861 corresponding to a lowest resolution print mode. The first subset of light sources 861 corresponds to a periodic pattern of light sources 841 spaced apart by a predefined first spacing $\Delta S_1$ which is a first integer multiple of the light-source spacing $\Delta S$ (in this example, the first integer is 4 so that $\Delta S_1=4\Delta S$). In the illustrated example, the first subset of light sources 861 includes the first light source 841 in each of the sections 842

The second print mode 852 shown in FIG. 19B utilizes a second subset of light sources 862 corresponding to a medium resolution print mode. The second subset of light sources 862 corresponds to a periodic pattern of light sources 841 spaced apart by a predefined second spacing $\Delta S_2$ which is a second integer multiple of the light-source spacing $\Delta S$, wherein the second integer multiple is less than the first integer multiple (in this example, the second integer multiple is 2 so that $\Delta S_2=2\Delta S$). In the illustrated example, the second subset of light sources 862 includes all of the light sources 841 in the first subset of light sources 861 (FIG. 19A), and additionally includes the third light source 841 in each of the sections 842.

The third print mode 853 shown in FIG. 19C utilizes a third subset of light sources 863 corresponding to a high-resolution print mode. The third subset of light sources 863 corresponds to a periodic pattern of light sources 841 spaced apart by a predefined second spacing $\Delta S_3$ which is a third integer multiple of the light-source spacing $\Delta S$, wherein the third integer multiple is less than the second integer multiple (in this example, the third integer is 1 so that $\Delta S_3=\Delta S$). In the illustrated example, the third subset of light sources 863 includes all of the light sources in the second subset of light sources 862 (FIG. 19B), and additionally includes the second and fourth light sources 841 in each of the sections 842.

In the exemplary embodiment shown in FIGS. 19A-19C, the sequence of printing resolutions is a dyadic sequence including 3 different resolutions (i.e., 300 dpi, 600 dpi and 1200 dpi). However, this is not a requirement. For example, in other embodiments the sequence of printing resolutions can include 2 different resolutions (e.g., 600 dpi and 1200 dpi) or 4 different resolutions (e.g., 150 dpi, 300 dpi, 600 dpi and 1200 dpi). It is also not required that the printing resolution sequence be a dyadic sequence having resolutions that are separated by factors of 2×. For example, the sequence of printing resolution sequence can consist of 300 dpi and 1200 dpi resolutions, or 900 dpi and 1200 dpi resolutions.

When a dyadic sequence is used, the process of assigning the light sources to the appropriate subsets can be generalized as follows:
1. For the coarsest image resolution (e.g., 150 dpi), the first light source in each section 842 is assigned to the first subset of light sources 861.
2. For the next finest image resolution (e.g., 300 dpi), divide each section 842 into two subsections and assign the first light source in the second subsection to the second subset of light sources 862.
3. For each additional image resolution (e.g., 600 and 1200 dpi), divide each subsection into two finer subsections and assign the first light source in the second subsection to the corresponding subset of light sources.
4. Repeat step 3 until all of the light sources have been assigned to a corresponding subset of light sources.

Figure 20:
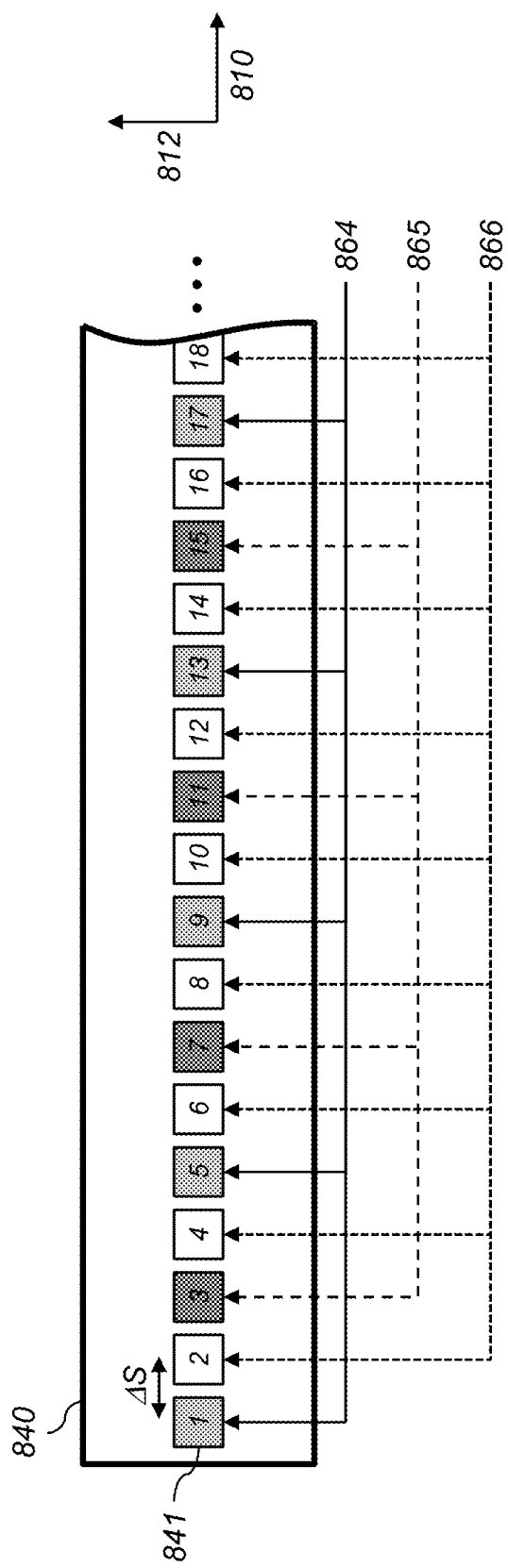
FIG. 20 illustrates first, second and third groups of light sources in a dyadic arrangement.

In accordance with the present invention, the light sources 841 in the printhead 840 are assigned to a series of groups of light sources 864, 865, 866 as illustrated in FIG. 20, wherein one or more of the groups of light sources 864, 865, 866 are loaded sequentially with image data depending on which print mode is being used. The first group of light sources 864 corresponds to the light sources 841 in the first subset of light sources 861 (FIG. 19A). The second group of light sources 865 corresponds to the light sources 841 in the second subset of light sources 862 (FIG. 19B) that are not in the first subset of light sources 861. Similarly, the third group of light sources 866 corresponds to the light sources 841 in the third subset of light sources 863 (FIG. 19C) that are not in the second subset of light sources 862. In this way each of the light sources 841 in the printhead 840 are assigned to one of the light sources 864, 865, 866.

In accordance with the present invention, when the printer is used in the first print mode 851 (FIG. 19A), image data is only loaded into the printhead memory for the first group of light sources 866, with the printhead memory for the other light sources 841 being preloaded with the code value that corresponds to no exposure (e.g., CV=0). When the printer is used in the second print mode 852 (FIG. 19B), image data is first loaded into the printhead memory for the first group of light sources 866, and then image data is loaded into the printhead memory for the second group of light sources 867. Similarly, when the printer is used in the third print mode 853 (FIG. 19C), image data is first loaded into the printhead memory for the first group of light sources 866, then image data is loaded into the printhead memory for the second group of light sources 867 and finally image data is loaded into the printhead memory for the third group of light sources 868. This architecture has the advantage that image data is only loaded into the printhead memory associated with the light sources 841 that are needed for a particular printhead. This is in contrast to prior art methods which utilize a sequential image data loading process which requires that image data must be loaded into the printhead memory associated with all of the light sources 841, even if they are not all used.

Figure 21:
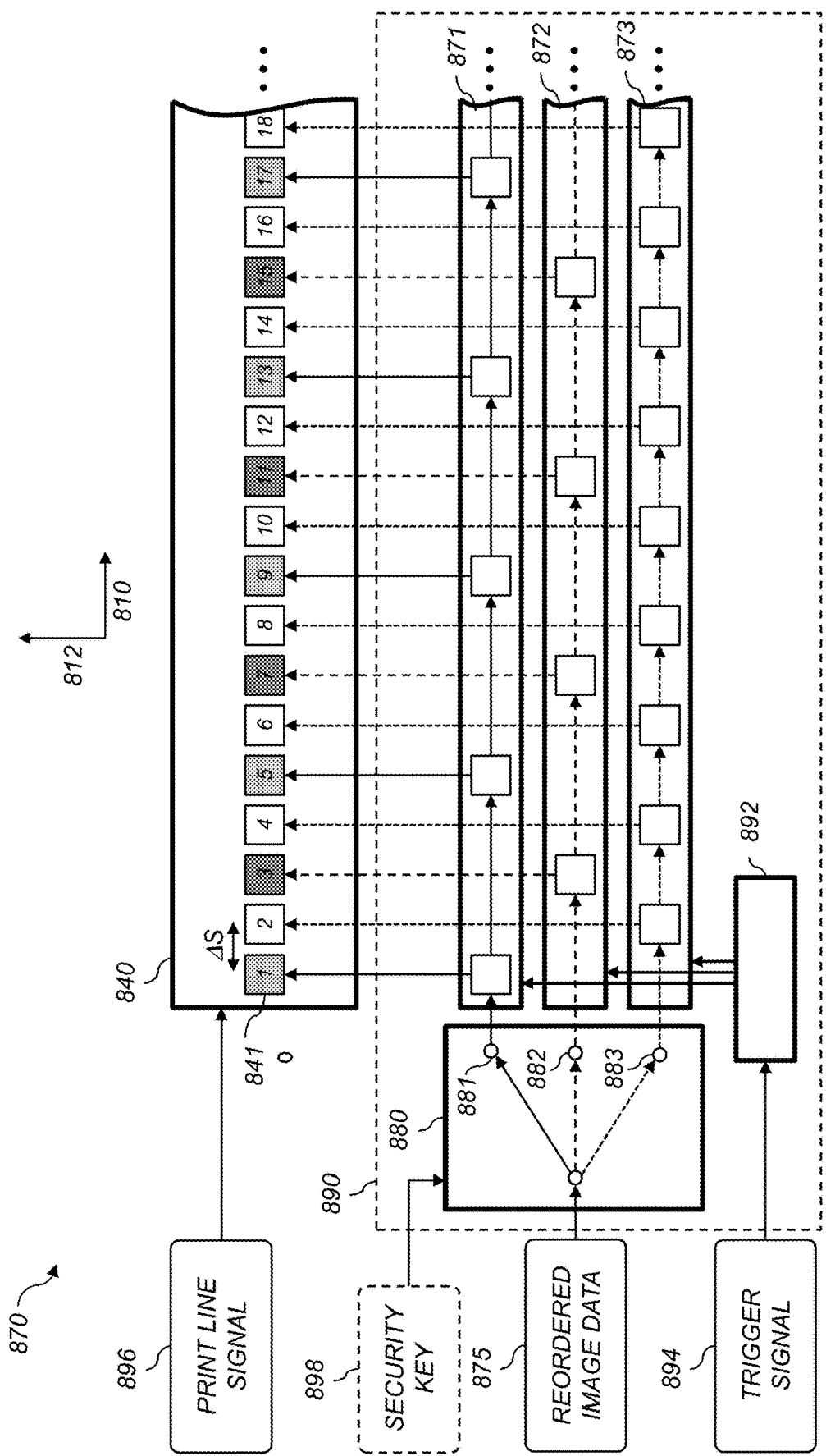
FIG. 21 illustrates a hierarchical printing architecture for printing in a plurality of print modes having different cross-track resolutions.

FIG. 21 illustrates a hierarchical printhead system 870 for printing in a plurality of print modes having different cross-track resolutions using the approach outlined above. A first printhead memory 871 is used to store image data associated with the first group of light sources 864 (FIG. 20), a second printhead memory 872 is used to store image data associated with the second group of light sources 865 (FIG. 20), and a third printhead memory 873 is used to store image data associated with the third group of light sources 866 (FIG. 20). In a preferred embodiment, the printhead memories 871, 872, 873 are shift registers which are loaded sequentially by shifting the image data down the shift register. The printhead memories 871, 872, 873 are preferably hard-wired to the corresponding light sources 841 in the printhead 840. The printhead memories 871, 872, 873 are preferably pre-loaded with the code value that corresponds to no exposure (e.g., CV=0) before the image printing process commences. It is only necessary to do this once before the first line of image data is printed.

In an exemplary embodiment, the image data comes into the hierarchical printhead system 870 in the form of reordered image data 875, where the processed image data 428 (FIG. 17) has been reordered in accordance with the cross-track resolution of the print mode (e.g., in a dyadic image data sequence). In some configurations, the reordering process can be performed in the printer module controller 430 (FIG. 17), although it can also be performed in other processing locations. For example, if the selected print mode uses the highest cross-track resolution (e.g., 1200 dpi), then the reordered image data 875 stores the image data associated with the first group of light sources 864, followed by the image data associated with the second group of light sources 865, and finally the image data associated with the third group of light sources 866 (FIG. 20). If the selected print mode uses the medium cross-track resolution (e.g., 600 dpi), then the reordered image data 875 stores the image data associated with the first group of light sources 864, and then by the image data associated with the second group of light sources 865. And if the selected print mode uses the lowest cross-track resolution (e.g., 300 dpi), then the dyadic image data 875 stores only the image data associated with the first group of light sources 864.

A switching unit 880 is provided to direct the reordered image data 875 into the appropriate printhead memory 871, 872, 873. The switching unit 880 is first set to a first switch position 881 which directs the image data corresponding to the first group of light sources 864 (FIG. 20) to be serially loaded into the first printhead memory 871. If the image data is printed in the second print mode 852 or the third print mode 853, the switching unit 880 is then set to a second switch position 882 which directs the image data corresponding to the second group of light sources 865 (FIG. 20) to be serially loaded into the second printhead memory 872. Finally, if the image data is printed in the third print mode 853, the switching unit 880 is then set to a third switch position 883 which directs the image data corresponding to the third group of light sources 866 (FIG. 20) to be serially loaded into the third printhead memory 873.

Once the image data has been loaded into the printhead memories 871, 872, 873 that are used in the selected print mode, a data load trigger 892 is used to simultaneously load the image data into the corresponding pixels of the printhead 840 in response to a trigger signal 894, and then a print line signal 896, sometimes referred to as a start-of-line signal, is used to activate the light sources 841 in the printhead 840 in accordance with the stored image data to print a line of the image, wherein the pixel code value for each image pixel controls an exposure level for the corresponding light source. This process is then repeated for each line of image data to print the entire digital image.

In an exemplary embodiment, the printhead memory 871, 872, 873 and the switching unit 880 are implemented as components of a driver chip 890 which is adapted to receive the reordered image data 875 from the printer module controller 430 (FIG. 17) and load the image data into the printhead 840. In an alternate embodiment, the driver chip 890 can also perform the reordering process to reorder the image data according to the selected print mode. In some configurations, the printhead memory 871, 872, 873 can all be different contiguous memory blocks within a single digital memory structure.

In order for the hierarchical printhead system 870 to function properly, it is critical for the incoming reordered image data 875 be properly reordered according to the selected print mode (i.e., in a dyadic fashion), and for the switching unit 880 to be properly synchronized so that the image data can be directed into the correct printhead memory 871, 872, 873 as has been previously described. If the switching unit 880 is not properly synchronized, the resulting printed image will be severely scrambled. This behavior can be leveraged to provide a security feature to prevent the hierarchical printhead system 870 from being used in an unauthorized printing system. A security key 898 (e.g., a predefined digital code) can be used to control the behavior of the switching unit 880 such that when the correct security key 898 is provided the behavior of the switching unit 880 will be properly synchronized with the received reordered image data 875. However, if no security key 898, or an invalid security key 898, is provided the image data will be printed in a scrambled form. As a result, the hierarchical printhead system 870 will not be able to function correctly without authorization, even if the system is rebooted. Since the appropriate behavior of the switching unit 880 will depend on the selected print mode, different security key values can be defined for each of the allowed print modes to enable proper printing.

An advantage of the present invention is that for print modes having a lower cross-track resolution than the printhead, the image data can be rendered to the lower resolution, and image processing operations such as halftoning can be applied at that lower resolution. The reduced resolution image data can then be loaded into the printhead. This reduces the computation time and data loading time relative to prior art embodiments where image data having the full resolution of the printhead must be computed and loaded into the printhead even for lower resolution print modes.

Like the telecommunication network where network traffic congestion and data rate are constantly being monitored and dynamically regulated to maintain system stability, a print mode having a specified dyadic level can be initially predetermined in the job ticket at the digital front end. The dyadic level can then be adaptively adjusted during the print reproduction process for overall print system performance optimization (e.g., system performance can be characterized by metrics such as system throughput, image quality, toner usage, etc.).

The traditional printing resolution and halftone selection is done while setting up the job ticket, which cannot be changed by the print engine. This constraint limits the real-time printing process optimization capability because the overall image quality condition of the digital printing system is varying dynamically. Since the imaging process robustness is negatively correlated with the halftone screen frequency and the selected printing resolution imposes a constraint on the allowable highest halftone screen frequencies, an adaptive rendering resolution module first receives the print job from the digital front end server and the nonuniformity metric measured on a printed target in real-time. A nonuniformity metric threshold, $T_j$, is associated with a dyadic printing resolution, $R_j$. When the measured nonuniformity exceeds the threshold $T_j$, the adaptive rendering resolution module can limit the current printing resolution R to be at most $R_j$. The adaptively selected resolution R can then be sent to the computational screening module to ensure that the input image is properly screened.

The dyadic level can also be used to control the output power (e.g., using the current control parameters 710) and the exposure clock of each light source (e.g., using the pulse timing functions 610) to provide the appropriate exposure for the corresponding print mode. Generally, the overall exposure should be maintained across all print modes. In an exemplary embodiment, the output power of the operating LED, which is controlled by the working voltage, is controlled to be inversely proportional to the printing resolution associated with the print mode. Accordingly, if the operating voltage of light source at the highest imaging resolution mode is $V_0$, the operating voltage needs to be raised to $2V_0$ if the imaging resolution is dropped to the next lower level, and the operating voltage should be raised to $4V_0$ if the imaging resolution is reduced by 2 levels. Furthermore, parameters inside the halftone processor 425 (FIG. 17) can also be controlled in accordance with the dyadic level in order to optimize the halftoning process in accordance with the printing resolution.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing module
32 printing module
33 printing module
34 printing module
35 printing module
38 print image
39 fused image
40 supply unit
42 receiver
42a receiver
42b receiver
50 transfer subsystem
60 fuser module
62 fusing roller
64 pressure roller
66 fusing nip
68 release fluid application substation
69 output tray
70 finisher
81 transport web
86 cleaning station
99 logic and control unit (LCU)
100 printer
111 imaging member
112 intermediate transfer member
113 transfer backup member
201 first transfer nip
202 second transfer nip
206 photoreceptor
210 charging subsystem
211 meter
212 meter
213 grid
216 surface
220 exposure subsystem
225 development station
226 toning shell
227 magnetic core
240 power source
300 page description file
305 pre-processing system
310 digital front end (DFE)
315 raster image processor (RIP)
320 color transform processor
325 compression processor
330 image processing module
335 decompression processor
340 halftone processor
345 image enhancement processor
350 image data
360 metadata
370 print engine
400 print engine
405 data interface
410 metadata interpreter
415 control signals
420 resolution modification processor
425 halftone processor
428 processed image data
430 printer module controller
435 printer module
440 image capture system
450 printed image
460 digital memory
500 pixel code value
505 calibration LUT
510 apply calibration LUT step
515 gain correction values
520 apply gain corrections step
525 quantization LUT
530 apply quantization step
540 quantized exposure value
550 control light source exposure time step
560 control light source current step
570 data processing electronics
580 printhead electronics
590 determine gain corrections process
600 determine pulse timing function process
605 aim exposure function
610 pulse timing function
660 master clock signal
670 exposure clock signal
680 light source activation function
700 determine current control parameters process
710 current control parameters
715 initial current control parameters
720 test target image data
725 print test target step
730 printed test target
735 scan test target step 740 captured image
745 analyze captured image step
750 light-source-dependent exposure errors
755 determine updated current control parameters step
760 test target
800 uniform patch
802 lightest uniform patch
804 darkest uniform patch
806 alignment mark
810 cross-track direction
812 in-track direction
840 printhead
841 light source
842 section
851 first print mode
852 second print mode
853 third print mode
861 first subset of light sources
862 second subset of light sources
863 third subset of light sources
864 first group of light sources
865 second group of light sources
866 third group of light sources
870 hierarchical printhead system
871 first printhead memory
872 second printhead memory
873 third printhead memory
875 reordered image data
880 switching unit
881 first switch position
882 second switch position
883 third switch position
890 driver chip
892 data load trigger
894 trigger signal
896 print line signal
898 security key
900 align image step
905 determine light source positions step
910 determine light-source-dependent code values step
915 determine light-source-dependent exposure errors step
920 graph
930 calibration curve
940 graph
950 graph
960 graph
962 graph
964 graph
970 user interface
972 resolution selection
974 print speed selection

The invention claimed is:

1. A hierarchical printhead system adapted to support multiple print modes in a digital printing system, comprising:
　a printhead including an array of pixels, each pixel having an associated light source for exposing a photosensitive medium moving past the printhead at a defined velocity, the light sources being spaced apart by a light-source spacing in a cross-track direction, wherein the light sources are activated in response to a print line signal, an exposure level provided by each light source being controlled by a corresponding pixel code value;
　wherein a first subset of the light sources is used in a first print mode, the first subset of light sources being a periodic pattern of light sources spaced apart by a predefined first spacing which is a first integer multiple of the light-source spacing; and
　wherein a second subset of the light sources is used in a second print mode, the second subset of light sources being a periodic pattern of light sources spaced apart by a predefined second spacing which is a second integer multiple of the light-source spacing, the second integer multiple being less than the first integer multiple, and wherein the second subset of light sources includes all of the light sources in the first subset of light sources;
　a first printhead memory adapted to load image data into a first group of light sources, the first group of light sources corresponding to the first subset of light sources;
　a second printhead memory adapted to load image data into a second group of light sources, the second group of light sources corresponding to the light sources in the second subset of light sources that are not in the first subset of light sources;
　a switching unit adapted to receive lines of image data and direct the received image data into the appropriate printhead memories, each line of image data including a one-dimensional array of image pixels having pixel code values, wherein the lines of image data have been reordered in accordance with a specified print mode;
　wherein if the specified print mode is the first print mode, the switching unit receives image data for the first group of light sources and directs the received image data for the first group of light sources into the first printhead memory; and
　wherein if the specified print mode is the second print mode, the switching unit first receives first image data for the first group of light sources and directs the received image data for the first group of light sources into the first printhead memory, and then receives image data for the second group of light sources and directs the received image data for the second group of light sources into the second printhead memory; and
　a data load trigger that causes the image data stored in the first and second printhead memories to be loaded into the corresponding pixels of the printhead for printing using the corresponding light sources.

2. The hierarchical printhead system of claim 1, wherein a third subset of the light sources is used in a third print mode, the third subset of light sources being a periodic pattern of light sources spaced apart by a predefined third spacing which is a third integer multiple of the light-source spacing, the third integer multiple being less than the second integer multiple, wherein the third subset of light sources includes all of the light sources in the second subset of light sources;
　further including a third printhead memory adapted to load image data into a third group of light sources, the third group of light sources corresponding to the light sources in the third subset of light sources that are not in the second subset of light sources;
　wherein if the specified print mode is the third print mode, the switching unit first receives image data for the first group of light sources and directs the received image data for the first group of light sources into the first printhead memory, then receives image data for the second group of light sources and directs the received image data for the second group of light sources into the second printhead memory, and then receives image data for the third group of light sources and directs the received image data for the third group of light sources into the third printhead memory.

3. The hierarchical printhead system of claim 2, wherein the first integer multiple is four, the second integer multiple is two, and the third integer multiple is one.

4. The hierarchical printhead system of claim 2, wherein a fourth subset of the light sources is used in a fourth print mode, the fourth subset of light sources being a periodic pattern of light sources spaced apart by a predefined fourth spacing which is a fourth integer multiple of the light-source spacing, the fourth integer multiple being less than the third integer multiple, and wherein the fourth subset of light sources includes all of the light sources in the third subset of light sources;

further including a fourth printhead memory adapted to load image data into a fourth group of light sources, the fourth group of light sources corresponding to the light sources in the fourth subset of light sources that are not in the third subset of light sources;

wherein if the specified print mode is the fourth print mode, the switching unit first receives image data for the first group of light sources and directs the received image data for the first group of light sources into the first printhead memory, then receives image data for the second group of light sources and directs the received image data for the second group of light sources into the second printhead memory, then receives image data for the third group of light sources and directs the received image data for the third group of light sources into the third printhead memory, and then receives image data for the fourth group of light sources and directs the received image data for the fourth group of light sources into the fourth printhead memory.

5. The hierarchical printhead system of claim 4, wherein the first integer multiple is eight, the second integer multiple is four, the third integer multiple is two, and the fourth integer multiple is one.

6. The hierarchical printhead system of claim 1, wherein the subsets of light sources form a dyadic sequence.

7. The hierarchical printhead system of claim 1, wherein the first and second printhead memories and the switching unit are components of a driver chip.

8. The hierarchical printhead system of claim 1, wherein the printhead memory corresponding to any light sources that are not used in the specified print mode are pre-loaded with pixel code values corresponding to an exposure level of zero.

9. The hierarchical printhead system of claim 1, wherein the image data stored in the first and second printhead memories is simultaneously loaded into the corresponding pixels of the printhead in response to the data load trigger.

10. The hierarchical printhead system of claim 1, wherein an exposure time to be provided by each light source is determined using a pulse timing function responsive to the corresponding pixel code value, wherein the pulse timing function is associated with the specified print mode.

11. The hierarchical printhead system of claim 1, wherein the switching unit operates responsive to a security key such that the switching unit will only direct the received image data to the appropriate printhead memory if the security key has a predefined security key value.

12. The hierarchical printhead system of claim 11, wherein each print mode has a different predefined security key value.

\* \* \* \* \*